US 12,177,737 B2

(12) United States Patent
Massey et al.

(10) Patent No.: US 12,177,737 B2
(45) Date of Patent: Dec. 24, 2024

(54) SYSTEMS AND METHODS FOR CONTACT NETWORK ANALYSIS INCLUDING ASSESSING SOCIAL DISTANCING

(71) Applicant: PwC Product Sales LLC, New York, NY (US)

(72) Inventors: Alec Massey, Arlington, VA (US); Laurence Palk, Portland, OR (US); Marc Mazzie, Washington, DC (US); Patrick Parodi, Bethesda, MD (US); Robert Mesirow, Falls Church, VA (US); Siddhant Bhatia, Great Falls, VA (US); Jordan Srote, St. Louis, MO (US); Jonathan Howlette, Chicago, IL (US)

(73) Assignee: PwC Product Sales LLC, New York, NY (US)

( * ) Notice: Subject to any disclaimer, the term of this patent is extended or adjusted under 35 U.S.C. 154(b) by 345 days.

(21) Appl. No.: 17/663,116

(22) Filed: May 12, 2022

(65) Prior Publication Data
US 2022/0400355 A1    Dec. 15, 2022

Related U.S. Application Data

(60) Provisional application No. 63/209,780, filed on Jun. 11, 2021.

(51) Int. Cl.
*H04W 4/02*    (2018.01)
*H04W 4/06*    (2009.01)
*H04W 4/21*    (2018.01)

(52) U.S. Cl.
CPC ............. *H04W 4/023* (2013.01); *H04W 4/06* (2013.01); *H04W 4/21* (2018.02)

(58) Field of Classification Search
None
See application file for complete search history.

(56) References Cited

U.S. PATENT DOCUMENTS

| 7,598,854 B2 * | 10/2009 | Wong | G01S 5/14 340/572.1 |
| 8,405,503 B2 * | 3/2013 | Wong | G01S 5/0284 340/517 |

(Continued)

FOREIGN PATENT DOCUMENTS

WO    2020/005786 A1    1/2020

OTHER PUBLICATIONS (June 2020). "Covid-19 Digital Contact Tracing Applications," GSM Association; pp. 1-11.

(Continued)

*Primary Examiner* — Kenneth B Wells
(74) *Attorney, Agent, or Firm* — Morrison & Foerster LLP

(57) ABSTRACT

Techniques for determining levels of interactions amongst entities in a group are provided. A plurality of mobile electronic devices detect signal data indicating when pairs of devices are proximate to one another. A receiver receives the detected signal data, and a data structure representing a contact network is generated based on the received detected signal data. Based on the contact network, a first metric is generated comprising a quantification of an average number of other entities in the contact network with which an entity in the contact network will have interactions in a predetermined amount of time. Based on the contact network, a second metric is generated comprising a quotient comprising of a size of a component of the contact network divided by an overall network size of the contact network. Based on the (Continued)

first and second metric, a level of interaction amongst entities in the group is determined.

51 Claims, 8 Drawing Sheets

(56) References Cited

U.S. PATENT DOCUMENTS

| | | | | |
|---|---|---|---|---|
| 9,075,909 | B2* | 7/2015 | Almogy | G16H 50/20 |
| 9,141,762 | B2* | 9/2015 | Lev | G16H 50/80 |
| 9,541,407 | B1 | 1/2017 | Mohler | |
| 9,727,790 | B1 | 8/2017 | Vaziri | |
| 10,198,779 | B2* | 2/2019 | Pittman | G16H 50/80 |
| 10,251,610 | B2* | 4/2019 | Parthasarathy | A61B 5/01 |
| 11,129,593 | B2 | 9/2021 | Gronseth et al. | |
| 11,367,534 | B2* | 6/2022 | McNamara | G16H 70/20 |
| 11,664,130 | B2* | 5/2023 | Tadesse | G16H 50/20 |
| | | | | 705/2 |
| 11,705,247 | B2* | 7/2023 | Marinescu | G16H 50/80 |
| | | | | 705/3 |
| 11,783,240 | B2* | 10/2023 | Leach | G16H 50/80 |
| | | | | 705/2 |
| 11,818,624 | B1* | 11/2023 | Naranjo | H04W 4/80 |
| 2003/0204130 | A1* | 10/2003 | Colston, Jr. | G16H 50/80 |
| | | | | 600/300 |
| 2007/0229290 | A1* | 10/2007 | Kahn | G16H 50/80 |
| | | | | 702/19 |
| 2008/0103368 | A1* | 5/2008 | Craine | G16H 10/65 |
| | | | | 600/300 |
| 2008/0294540 | A1 | 11/2008 | Celka et al. | |
| 2011/0038470 | A1 | 2/2011 | Kent | |
| 2014/0200929 | A1 | 7/2014 | Fitzgerald et al. | |
| 2017/0039339 | A1 | 2/2017 | Bitran et al. | |
| 2017/0330042 | A1 | 11/2017 | Vaziri | |
| 2018/0052970 | A1* | 2/2018 | Boss | G06F 21/35 |
| 2019/0325316 | A1 | 10/2019 | Anderson et al. | |
| 2020/0068350 | A1 | 2/2020 | Chai et al. | |
| 2020/0176124 | A1* | 6/2020 | Chatterjea | G16H 50/80 |
| 2021/0006650 | A1 | 1/2021 | Yankov et al. | |
| 2021/0313074 | A1 | 10/2021 | Mesirow et al. | |
| 2021/0398659 | A1* | 12/2021 | Sharma | G16H 40/67 |
| 2021/0398684 | A1 | 12/2021 | Mesirow et al. | |
| 2021/0400428 | A1* | 12/2021 | Loh | G08B 5/22 |
| 2023/0276198 | A1* | 8/2023 | Raj | H04W 4/023 |
| | | | | 455/456.3 |

OTHER PUBLICATIONS

Barry. (Apr. 2020) "An Army of Virus Tracers Takes Shape in Massachusetts." located at https://web.archive.org/web/20200416091337/https://www.nytimes.com/2020/04/16/us/coronavirus-massachusetts-contact-tracing.html, visited on May 1, 2023. (8 pages).

CDC. (Apr. 2020) "Contact Tracing: Part of a Multipronged Approach to Fight the Covid-19 Pandemic," located at https://www.cdc.gov/coronavirus/2019-ncov/php/principles-contact-tracing.html. (3 pages).

CDC. (Dec. 2020) "Case Investigation and Contact Tracing: Part of a Multipronged Approach to Fight the Covid-19 Pandemic," located at https://web.archive.org/web/20210610171254/https://www.cdc.gov/coronavirus/2019-ncov/php/principles-contact-tracing.html, visited on May 11, 2023. (4 pages).

CDC. (Mar. 2020) "Public Health Recommendations for Community-Related Exposure," located at https://web.archive.org/web/20200511013816/https://www.cdc.gov/coronavirus/2019-ncov/php/public-health-recommendations.html, visited on May 11, 2020. (2 pages).

CDC. (Mar. 2021) "Public Health Guidance for Community-Related Exposure," located at https://web.archive.org/web/20210610173826/https://www.cdc.gov/coronavirus/2019-ncov/php/public-health-recommendations.html, visited on May 11, 2023. (2 pages).

International Search Report and Written Opinion mailed Jul. 23, 2021, directed to International Application No. PCT/US2021/025343; 13 pages.

International Search Report and Written Opinion mailed Nov. 19, 2021, directed to International Application No. PCT/US2021/037768; 18 pages.

Invitation to Pay Additional Fees mailed Sep. 28, 2021, directed to International Application No. PCT/US2021/037768; 14 pages.

Mesirow et al., U.S. Office Action dated Mar. 24, 2023, directed to U.S. Appl. No. 17/220,375; 13 pages.

Mesirow et al., U.S. Office Action dated Oct. 17, 2023, directed to U.S. Appl. No. 17/220,375; 15 pages.

Mesirow et al., U.S. Office Action dated Nov. 29, 2023, directed to U.S. Appl. No. 17/350,612; 17 pages.

* cited by examiner

SYSTEMS AND METHODS FOR CONTACT NETWORK ANALYSIS INCLUDING ASSESSING SOCIAL DISTANCING

REFERENCE TO RELATED APPLICATIONS

This application claims the benefit of U.S. Provisional Application No. 63/209,780, filed Jun. 11, 2021, the entire contents of which are incorporated herein by reference.

FIELD

This relates generally to systems and methods for analyzing contact networks, and more particularly to analyzing contact networks for quantifying interactions between persons or devices, including quantifying social distancing amongst groups of people.

BACKGROUND

In order to proactively mitigate the risks of disease outbreaks, groups of people may be encouraged to engage in social distancing, for example by limiting the number of interactions, frequency of interactions, and/or duration of interactions amongst different people in the group. Known methods of encouraging, assessing, and enforcing social-distancing practices include manually observing interactions amongst persons and manually encouraging compliance with social distancing practices.

SUMMARY

As explained above, known methods of encouraging, assessing, and enforcing social-distancing practices rely on manual observation of social interactions and manual intervention to encourage social distancing. Not only are these methods labor-intensive and inefficient, they are also not grounded in any reliably reproducible standards for assessing the extent to which an organization is successfully practicing social distancing. Accordingly, there is a need for automated systems and methods for reliably, reproducibly, efficiently, and accurately observing interactions between persons in a group and analyzing said interactions in order to gather data to determine the effectiveness of social distancing practices by the group. Furthermore, there is a need for reliable, reproducible, efficient, and accurate techniques for analyzing said data, once gathered, in order to assess, quantify, score, and/or visualize different aspects of interactions amongst the group, including by quantifying or scoring an overall level of social distancing being practiced by the group.

Disclosed herein are systems, methods, and techniques, that may address one or more of the above-identified needs. According to the techniques disclosed herein, data regarding interactions amongst persons (or other entities) in a group may be automatically gathered and said data may be used to generate and store a data structure representing a contact network for the group. The contact network may then be automatically analyzed and a plurality of attributes, metrics, and scores quantifying interactions amongst persons in the group may be generated based on the contact network. A determination of an overall social distancing score—e.g., a quantification of an extent to which the group is practicing social distancing—may be generated based on the contact network.

In order to gather data regarding interactions between persons in the group, the persons in a group may be monitored by one or more automated systems in order to determine when pairs of persons in the group have been proximate to one another. For example, proximity amongst pairs of persons in the group may be determined by gathering signal data that is detected by mobile electronic devices carried by persons in the group and analyzing said signal data. When a pair of persons in the group is sufficiently physically proximate to one another, a mobile electronic device of one of the persons may detect a signal emitted by a mobile electronic device of the other of the persons, indicating the two persons are sufficiently proximate to one another for signals to be exchanged between their devices; additionally or alternatively, both persons' mobile electronic devices may simultaneously detect a signal emitted by a third device, indicating the two persons are sufficiently proximate to the third device (and therefore to one another) to each detect the signal emitted by the third device. Thus, the system may automatically determine, based on direct exchange of signals between persons or based on simultaneous detection of common signals by multiple persons, that two persons have been proximate to one another.

Additionally or alternatively, data regarding interactions between persons in a group (or between entities in a group) may be gathered using one or more different techniques, for example by monitoring location data (e.g., using geolocation devices, camera-based surveillance systems, and/or signal-detection-based surveillance systems) in order to determine locations of persons and/or entities in the group and to then determine which persons and/or entities have been located at a common location with one another.

Once data regarding interactions between persons in the group is gathered, the system may automatically generate a data structure representing a contact network of persons (and/or other entities) in the group. Using the gathered data regarding interactions, a contact network may be constructed in which persons in the group are represented as nodes and interactions between respective pairs of persons in the group are represented as edges linking the associated pair of nodes. In some embodiments, the system may apply one or more proximity criteria in order to determine whether to generate an edge between a pair of nodes, wherein the proximity criteria may be used to analyze the underlying interactions data in order to determine whether interactions between the entities is significant enough (e.g., occurred within a maximum required physical proximity distance, occurred for more than a minimum required amount of continuous or total time, and/or occurred at least a minimum number of times). If it is determined that interaction between persons satisfies the proximity criteria, then an edge linking the nodes representing the persons may be generated. In some embodiments, the system may also apply one or more location criteria in order to ensure, before generating an edge representing an interaction between two persons, that interaction between a the two persons occurred within a predetermined location.

After the data structure representing the contact network is generated, the system may automatically analyze the contact network in order to generate a plurality of attributes, metrics, and scores quantifying interactions amongst persons in the group. A determination of an overall social distancing score—e.g., a quantification of an extent to which the group is practicing social distancing—may be generated based on the contact network. In some embodiments, an overall social distancing score may be calculated based on a plurality of underlying metrics that are themselves generated based on the contact network. For example, a social distancing score may be determined based on a first metric comprising a quantification of an average rate of interactions within the group and based on a second metric comprising a quantification of network exposure risk.

One or more alerts or other outputs may be generated in accordance with one or more of the generated scores or metrics, for example in accordance with determining that a group's levels of social distancing do not meet predetermined targets. In some embodiments, one or more visualizations of the contact network and/or of the analyses thereof may be generated and displayed.

In some embodiments, a first system for determining a parameter for assessing social distancing between persons in a group is provided, the first system comprising: a plurality of mobile electronic devices, each of the plurality of mobile electronic devices configured to detect signal data indicating when it is proximate to another one of the plurality of mobile electronic devices, wherein each of the plurality of mobile electronic devices is associated with a location of a respective person in the group; a receiver configured to receive, from each of the plurality of mobile electronic devices, detected signal data; a storage system configured to store a data structure representing a contact network, generated based on the received signal data, representing which pairs of the plurality of mobile electronic devices have been proximate to one another; and one or more processors configured to: generate, based on the contact network, a first metric representing a predicted number of entities in the contact network with which an entity in the contact network will have interactions in a predetermined amount of time; generate, based on the contact network, a second metric comprising a quantification of network exposure risk based on a size of a component of the contact network and an overall network size of the contact network; and determine, based on the first metric and the second metric, the parameter for assessing social distancing between persons in the group.

In some embodiments of the first system, the one or more processors are configured to generate the data structure representing the contact network based on the received signal data, wherein generating the data structure representing the contact network comprises: generating a plurality of nodes, wherein each node of the plurality of nodes represents a respective one of the mobile electronic devices; and generating a plurality of edges linking respective pairs of nodes, wherein each edge of the plurality of edges is generated based on the signal data indicating that the respective mobile electronic devices represented by the respective pair of nodes were proximate to one another.

In some embodiments of the first system, the one or more processors is configured to generate an edge for a respective pair of nodes in accordance with determining that one or more proximity criteria are satisfied by signal data corresponding to the respective mobile electronic devices represented by the respective pair of nodes.

In some embodiments of the first system, the one or more processors are configured to generate the data structure representing the contact network based on the received signal data, wherein generating the data structure representing the contact network comprises: determining whether the received signal data satisfies one or more predefined inclusion criteria for inclusion in the contact network; and in accordance with determining that the received signal data satisfies the one or more predefined criteria for inclusion in the contact network, generating the data structure representing the contact network based on the received signal data.

In some embodiments of the first system, the one or more predefined inclusion criteria include a criteria that geolocation data associated with the signal data indicates that the signal data was detected within a predefined geographic location.

In some embodiments of the first system, determining the parameter for assessing social distancing comprises calculating a distance of a two-dimensional point from an origin, wherein the two-dimensional point is defined by a first coordinate based on the first metric and a second coordinate based on the second metric.

In some embodiments of the first system, the first coordinate comprises a minimum of the first metric and a predefined maximum value.

In some embodiments of the first system, generating the first metric comprises computing a mean degree of the contact network.

In some embodiments of the first system, generating the second metric comprises computing a quotient comprising the size of the component of the contact network divided by the overall network size of the contact network.

In some embodiments of the first system, the component of the contact network is a largest connected subgraph of the contact network.

In some embodiments of the first system, the component of the contact network is a largest subgraph of the contact network component for which all nodes in the subgraph are connected by less than or equal to a predetermined maximum number of degrees.

In some embodiments of the first system, the one or more processors are configured to generate and output an alert in accordance with determining that the parameter for assessing social distancing falls below a predetermined threshold level.

In some embodiments of the first system, the one or more processors are configured to generate and cause display of a visualization of the parameter for assessing social distancing between persons in the group.

In some embodiments, a first non-transitory computer-readable storage medium storing instructions for determining a parameter for assessing social distancing between persons in a group is provided, wherein the instructions are configured to be executed by a system comprising: a plurality of mobile electronic devices, each of the plurality of mobile electronic devices configured to detect signal data indicating when it is proximate to another one of the plurality of mobile electronic devices, wherein each of the plurality of mobile electronic devices is associated with a location of a respective person in the group; a receiver configured to receive, from each of the plurality of mobile electronic devices, detected signal data; a storage system configured to store a data structure representing a contact network, generated based on the received signal data, representing which pairs of the plurality of mobile electronic devices have been proximate to one another; and one or more processors, wherein the instructions are configured such that, when executed by the one or more processors, they cause the one or more processors to: generate, based on the contact network, a first metric representing a predicted number of entities in the contact network with which an entity in the contact network will have interactions in a predetermined amount of time; generate, based on the contact network, a second metric comprising a quantification of network exposure risk based on a size of a component of the contact network and an overall network size of the contact network; and determine, based on the first metric and the second metric, the parameter for assessing social distancing between persons in the group.

In some embodiments, a first method for determining a parameter for assessing social distancing between persons in a group is provided, the first method configured to be executed by a system comprising: a plurality of mobile electronic devices, each of the plurality of mobile electronic devices configured to detect signal data indicating when it is proximate to another one of the plurality of mobile electronic devices, wherein each of the plurality of mobile electronic devices is associated with a location of a respective person in the group; a receiver configured to receive, from each of the plurality of mobile electronic devices, detected signal data; a storage system configured to store a data structure representing a contact network, generated based on the received signal data, representing which pairs of the plurality of mobile electronic devices have been proximate to one another; and one or more processors, wherein the first method comprises: generating, based on the contact network, a first metric comprising a quantification of an average number of other entities in the contact network with which an entity in the contact network will have interactions in a predetermined amount of time; generating, based on the contact network, a first metric representing a predicted number of entities in the contact network with which an entity in the contact network will have interactions in a predetermined amount of time; generating, based on the contact network, a second metric comprising a quantification of network exposure risk based on a size of a component of the contact network and an overall network size of the contact network; and determining, based on the first metric and the second metric, the parameter for assessing social distancing between persons in the group.

In some embodiments, a second system for determining a parameter for assessing distancing between entities in a group is provided, the second system comprising: one or more sensors, each of the one or more sensors configured to monitor a location of a plurality of entities; a receiver configured to receive, from each of the one or more sensors, location data indicating locations over time for each of the plurality of entities; a storage system configured to store a data structure representing a contact network, generated based on the received location data, representing which pairs of the plurality of entities have been proximate to one another; and one or more processors configured to: generate, based on the contact network, a first metric representing a predicted number of entities in the contact network with which an entity in the contact network will have interactions in a predetermined amount of time; generate, based on the contact network, a second metric comprising a quantification of network exposure risk based on a size of a component of the contact network and an overall network size of the contact network; and determine, based on the first metric and the second metric, the parameter for assessing distancing between the plurality of entities.

In some embodiments of the second system, the one or more sensors comprise one or more geolocation sensors configured to monitor a geographic location of a respective entity of the plurality of entities.

In some embodiments of the second system, the one or more sensors comprise one or more optical sensors configured to monitor a location of a respective entity of the plurality of entities.

In some embodiments of the second system, the one or more sensors comprise one or more antennas configured to detect a signal indicative that the antenna is located within a predefined distance of a transmitter.

In some embodiments of the second system, one more of the antennas are carried by one of the entities.

In some embodiments of the second system, one or more of the transmitters are carried by one of the entities.

In some embodiments of the second system, the one or more processors are configured to generate the data structure representing the contact network based on the received location data, wherein generating the data structure representing the contact network comprises: generating a plurality of nodes, wherein each node of the plurality of nodes represents a respective one of the entities; and generating a plurality of edges linking respective pairs of nodes, wherein each edge of the plurality of edges is generated based on the location data indicating that the respective entities represented by the respective pair of nodes were proximate to one another.

In some embodiments of the second system, the one or more processors is configured to generate an edge for a respective pair of nodes in accordance with determining that one or more proximity criteria are satisfied by location data corresponding to the respective entities represented by the respective pair of nodes.

In some embodiments of the second system, the one or more processors are configured to generate the data structure representing the contact network based on the received location data, wherein generating the data structure representing the contact network comprises: determining whether the received location data satisfies one or more predefined inclusion criteria for inclusion in the contact network; and in accordance with determining that the received location data satisfies the one or more predefined criteria for inclusion in the contact network, generating the data structure representing the contact network based on the received signal data.

In some embodiments of the second system, the one or more predefined inclusion criteria include a criteria that the location data indicates that a location within a predefined geographic location.

In some embodiments of the second system, determining the parameter for assessing distancing comprises calculating a distance of a two-dimensional point from an origin, wherein the two-dimensional point is defined by a first coordinate based on the first metric and a second coordinate based on the second metric.

In some embodiments of the second system, the first coordinate comprises a minimum of the first metric and a predefined maximum value.

In some embodiments of the second system, generating the first metric comprises computing a mean degree of the contact network.

In some embodiments of the second system, generating the second metric comprises computing a quotient comprising the size of the component of the contact network divided by the overall network size of the contact network.

In some embodiments of the second system, the component of the contact network is a largest connected subgraph of the contact network.

In some embodiments of the second system, the component of the contact network is a largest subgraph of the contact network component for which all nodes in the subgraph are connected by less than or equal to a predetermined maximum number of degrees.

In some embodiments of the second system, the one or more processors are configured to generate and output an alert in accordance with determining that the parameter for assessing distancing falls below a predetermined threshold level.

In some embodiments of the second system, the one or more processors are configured to generate and cause display of a visualization of the parameter for assessing distancing between entities in the group.

In some embodiments, a second non-transitory computer-readable storage medium storing instructions for determining a parameter for assessing distancing between entities in a group is provided, wherein the instructions are configured to be executed by a system comprising: one or more sensors, each of the one or more sensors configured to monitor a location of a plurality of entities; a receiver configured to receive, from each of the one or more sensors, location data indicating locations over time for each of the plurality of entities; a storage system configured to store a data structure representing a contact network, generated based on the received location data, representing which pairs of the plurality of entities have been proximate to one another; and one or more processors, wherein the instructions are configured such that, when executed by the one or more processors, they cause the one or more processors to: generate, based on the contact network, a first metric representing a predicted number of entities in the contact network with which an entity in the contact network will have interactions in a predetermined amount of time; generate, based on the contact network, a second metric comprising a quantification of network exposure risk based on a size of a component of the contact network and an overall network size of the contact network; and determine, based on the first metric and the second metric, the parameter for assessing distancing between the plurality of entities.

In some embodiments, a second method for determining a parameter for assessing distancing between entities in a group is provided, the second method configured to be executed by a system comprising: one or more sensors, each of the one or more sensors configured to monitor a location of a plurality of entities; a receiver configured to receive, from each of the one or more sensors, location data indicating locations over time for each of the plurality of entities; a storage system configured to store a data structure representing a contact network, generated based on the received location data, representing which pairs of the plurality of entities have been proximate to one another; and one or more processors, wherein the second method comprises: generating, based on the contact network, a first metric representing a predicted number of entities in the contact network with which an entity in the contact network will have interactions in a predetermined amount of time; generating, based on the contact network, a second metric comprising a quantification of network exposure risk based on a size of a component of the contact network and an overall network size of the contact network; and determining, based on the first metric and the second metric, the parameter for assessing distancing between the plurality of entities.

In some embodiments, a third system for determining a parameter for assessing virtual interaction between entities in a group, the third system comprising: one or more sensors, each of the one or more sensors configured to monitor electronic communications between a plurality of entities; a receiver configured to receive, from each of the one or more sensors, communications data indicating interactions between one or more pairs amongst the plurality of entities; a storage system configured to store a data structure representing a contact network, generated based on the received communications data, representing which pairs of the plurality of entities have communicated with one another; and one or more processors configured to: generate, based on the contact network, a first metric representing a predicted number of entities in the contact network with which an entity in the contact network will have interactions in a predetermined amount of time; generate, based on the contact network, a second metric comprising a quantification of network exposure risk based on a size of a component of the contact network and an overall network size of the contact network; and determine, based on the first metric and the second metric, the parameter for assessing virtual interaction between entities.

In some embodiments of the third system, the plurality of entities comprises a plurality of electronic devices configured to communicate electronically amongst one another.

In some embodiments of the third system, the plurality of entities comprises a plurality of persons communicating amongst one another via electronic communication.

In some embodiments of the third system, the one or more processors are configured to generate the data structure representing the contact network based on the received communications data, wherein generating the data structure representing the contact network comprises: generating a plurality of nodes, wherein each node of the plurality of nodes represents a respective one of the entities; and generating a plurality of edges linking respective pairs of nodes, wherein each edge of the plurality of edges is generated based on the communications data indicating that the respective entities represented by the respective pair of nodes communicated with one another.

In some embodiments of the third system, the one or more processors is configured to generate an edge for a respective pair of nodes in accordance with determining that one or more communications criteria are satisfied by communications data corresponding to the respective entities represented by the respective pair of nodes.

In some embodiments of the third system, the one or more processors are configured to generate the data structure representing the contact network based on the received communications data, wherein generating the data structure representing the contact network comprises: determining whether the received communications data satisfies one or more predefined inclusion criteria for inclusion in the contact network; and in accordance with determining that the received communications data satisfies the one or more predefined criteria for inclusion in the contact network, generating the data structure representing the contact network based on the received communications data.

In some embodiments of the third system, determining the parameter for assessing virtual interaction comprises calculating a distance of a two-dimensional point from an origin, wherein the two-dimensional point is defined by a first coordinate based on the first metric and a second coordinate based on the second metric.

In some embodiments of the third system, the first coordinate comprises a minimum of the first metric and a predefined maximum value.

In some embodiments of the third system, generating the first metric comprises computing a mean degree of the contact network.

In some embodiments of the third system, generating the second metric comprises computing a quotient comprising the size of the component of the contact network divided by the overall network size of the contact network.

In some embodiments of the third system, the component of the contact network is a largest connected subgraph of the contact network.

In some embodiments of the third system, the component of the contact network is a largest subgraph of the contact network component for which all nodes in the subgraph are connected by less than or equal to a predetermined maximum number of degrees.

In some embodiments of the third system, the one or more processors are configured to generate and output an alert in accordance with determining that the parameter for assessing virtual interaction falls below a predetermined threshold level.

In some embodiments of the third system, the one or more processors are configured to generate and cause display of a visualization of the parameter for assessing virtual interaction between entities in the group.

In some embodiments, a third non-transitory computer-readable storage medium storing instructions for determining a parameter for assessing virtual interaction between entities in a group is provided, wherein the instructions are configured to be executed by a system comprising: one or more sensors, each of the one or more sensors configured to monitor electronic communications between a plurality of entities; a receiver configured to receive, from each of the one or more sensors, communications data indicating interactions between one or more pairs amongst the plurality of entities; a storage system configured to store a data structure representing a contact network, generated based on the received communications data, representing which pairs of the plurality of entities have communicated with one another; and one or more processors, wherein the instructions are configured such that, when executed by the one or more processors, they cause the one or more processors to: generate, based on the contact network, a first metric representing a predicted number of entities in the contact network with which an entity in the contact network will have interactions in a predetermined amount of time; generate, based on the contact network, a second metric comprising a quantification of network exposure risk based on a size of a component of the contact network and an overall network size of the contact network; and determine, based on the first metric and the second metric, the parameter for assessing virtual interaction between entities.

In some embodiments, a third method for determining a parameter for assessing virtual interaction between entities in a group is provided, wherein the method is configured to be executed by a system comprising: one or more sensors, each of the one or more sensors configured to monitor electronic communications between a plurality of entities; a receiver configured to receive, from each of the one or more sensors, communications data indicating interactions between one or more pairs amongst the plurality of entities; a storage system configured to store a data structure representing a contact network, generated based on the received communications data, representing which pairs of the plurality of entities have communicated with one another; and one or more processors, wherein the third method comprises: generating, based on the contact network, a first metric representing a predicted number of entities in the contact network with which an entity in the contact network will have interactions in a predetermined amount of time; generating, based on the contact network, a second metric comprising a quantification of network exposure risk based on a size of a component of the contact network and an overall network size of the contact network; and determining, based on the first metric and the second metric, the parameter for assessing virtual interaction between entities.

In some embodiments, any one or more of the features of any one or more of the embodiments set forth above may be combined with one another, and/or with other features or aspects of any method, system, technique, or device disclosed herein. The subject matter of this application may involve, in some cases, interrelated products, alternative solutions to a particular problem, and/or a plurality of different uses of a single system or article.

BRIEF DESCRIPTION OF THE FIGURES

The patent or application file contains at least one drawing executed in color. Copies of this patent or patent application publication with color drawings will be provided by the office upon request and payment of the necessary fee.

Figure 1:
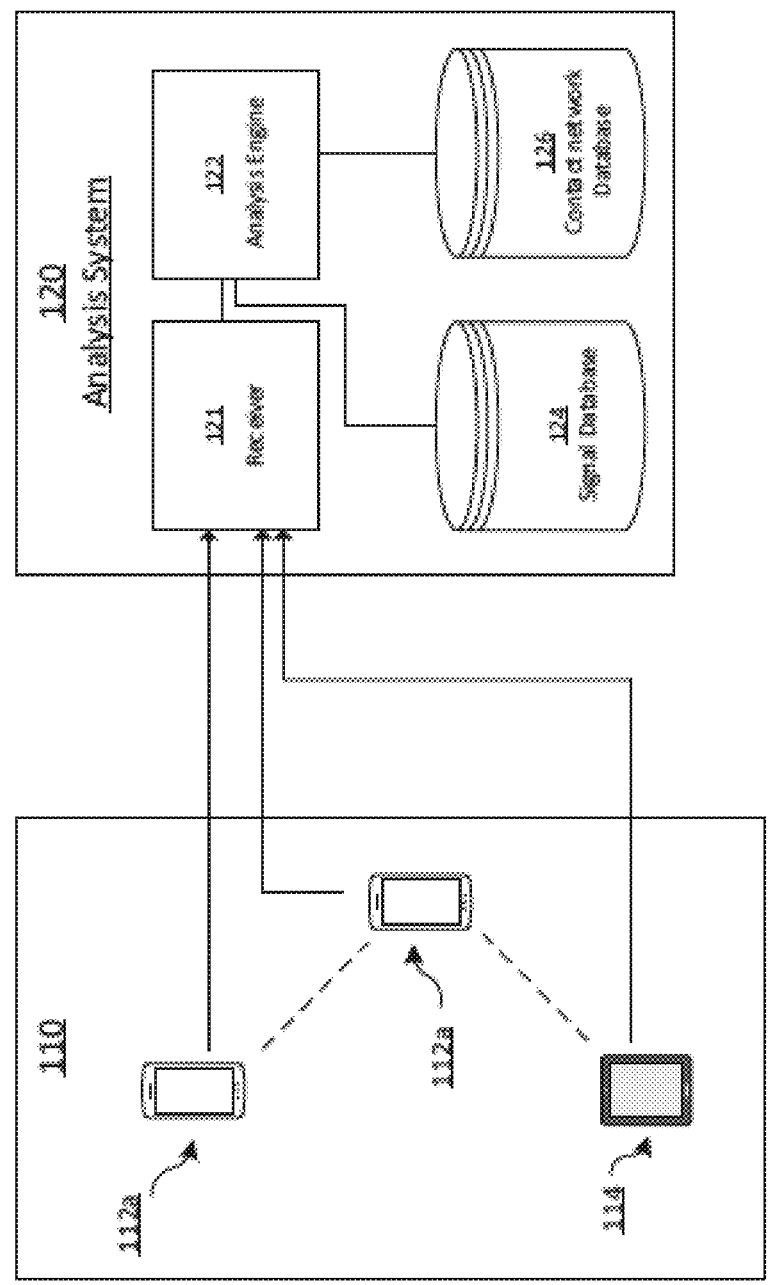
FIG. 1 shows a schematic representation of a system for monitoring and quantifying social distancing, in accordance with some embodiments.

These and other features of the present embodiments may be understood better by reading the following detailed description, taken together with the figures herein described. In the drawings, identical or nearly identical components illustrated in multiple figures may be represented by a like reference numeral. For purposes of clarity, not every component may be labeled in every drawing. Furthermore, as will be appreciated in light of this disclosure, the accompanying drawings are not intended to be drawn to scale or to limit the described embodiments to the specific configurations shown.

DETAILED DESCRIPTION

As described above, in some embodiments, a system for monitoring and quantifying social distancing amongst groups may automatically collect data regarding interactions amongst persons (or other entities) in a group, and said data may be used to generate and store a data structure representing a contact network for the group. The contact network may then be automatically analyzed to generate a plurality of attributes, metrics, and/or scores quantifying interactions amongst persons in the group. A determination of an overall social distancing score—e.g., a quantification of an extent to which the group is practicing social distancing—may be generated based on the contact network.

FIG. 1 shows a schematic representation of a system 100 for monitoring and quantifying social distancing, in accordance with some embodiments. As described herein, signals detected by and/or exchanged amongst devices 110 may be uploaded to analysis system 120, which may use the uploaded signals to determine which devices 110 have been in contact with (e.g., have been physically proximate to) one another and to generate and store a data structure representing a contact network based thereon. Analysis system 120 may then analyze the contact network in order to determine an amount of social distancing and to otherwise assess interactions and social distancing practices amongst a group of people associated (e.g., carrying) mobile devices 110.

While systems such as system 100 may be referred to herein as systems for monitoring social distancing in an attempt to mitigate disease outbreak risks amongst groups of people (e.g., amongst groups of people in an office, school, or hospital setting), a person of skill in the art will appreciate in light of the disclosure herein that systems such as those disclosed herein may be readily adapted for use in any context that may require monitoring of interactions between persons and/or entities in a group in order to determine an amount of distancing between the entities and/or to otherwise characterize the frequency, duration, number, and/or density of interactions amongst the group. In some embodiments, systems 100 may be configured to provide any of the data collection functionality, data analysis functionality, contact network analysis functionality, and/or any other functionality described above and/or elsewhere herein.

In some embodiments, system 100 may be provided as part of a contact tracing system. For example, system 100 may leverage one or more determinations made by a contact-tracing system that are applied to determine whether a pair of persons and/or entities have been "in contact" with one another for purposes of contact tracing, and may apply those determinations in order to determine whether the pair of persons and/or entities should be represented as linked together in a contact network data structure. In this manner, system 100 may be said to perform "contact tracing" for every person/entity in a group in order to determine all inter-group contact of that person. This determination may be used to build the data structure representing the contact network, which may then be analyzed in order to assess the group's social distancing practices, as described herein.

In the example of FIG. 1, system 100 comprises a plurality of mobile electronic devices 110. In some embodiments, the plurality of mobile electronic devices may be personal mobile electronic devices (e.g., smart phones or tablets) and/or may be devices issued by an institution such as employer or school. In some embodiments, devices 110 may be configured by an over-the-air software update to perform one or more of the data collection, data analysis, and/or contact network analysis functions described herein. In some embodiments, the mobile electronic devices 110 may include cell phone devices 112. In some embodiments, the mobile electronic devices 110 may include standalone device 114 configured to broadcast, collect, and upload signals for use in determination of interactions for creation and analysis of a contact network as described herein. While the group of mobile electronic devices 110 is shown as including three illustrative devices, it should be understood that the group of devices 110 may include any suitable number of devices, such as dozens, hundreds, thousands, tens of thousands, or millions of devices or more.

In some embodiments, each of a plurality of mobile devices 110 are identifiable by system 100, such as by a unique device identifier, a unique user identifier, or other metadata. In this way, the signal data of multiple persons or mobile electronic devices may be tracked and stored. For the purposes of illustration, this disclosure may refer to characteristics of mobile electronic device 112a, but a person of ordinary skill in the art will appreciate in light of the disclosure herein that those characteristics may be shared, in some embodiments, by one or more additional devices that may be in a plurality of mobile electronic devices 110 of system 100.

In some embodiments, mobile device 112a may comprise one or more antennas configured to detect electromagnetic signals emitted by devices in the environment or by one or more other devices in the plurality of mobile electronic devices 110. The electromagnetic signals may comprise signals emitted by one or more of: Wi-Fi access points, Bluetooth devices, network-enabled appliances, network-enabled infrastructure devices, IoT devices, and another of the plurality of mobile electronic devices.

As device 112a moves about different locations, it may detect signals from different devices in the one or more mobile electronic devices 110, and may detect those signals at different strengths; the identity and characteristics of those signals detected by device 112a may be used, as described herein, to determine whether the device is considered to have been in contact with one or more other devices 110, for example based on time in proximity and/or distance of physical proximity of device 112a to another device of mobile electronic devices 110.

In some embodiments, mobile electronic device 112a may comprise one or more antennas configured to emit electromagnetic signals. The electromagnetic signals emitted by mobile electronic device 112a may comprise one or more of: Bluetooth/BLE signals, Wi-Fi hot spot signals, signals indicating a MAC address, and/or signals indicating a UUID and/or an AdID of the device.

In some embodiments, the mobile electronic devices 110 may be configured to detect (e.g., to "listen for") electromagnetic signals emitted by other users' mobile electronic devices. Said electromagnetic signals, such as WiFi signals and/or Bluetooth signals, may only be able to be detected when the emitting device and the listening device are within a certain physical proximity (e.g., a certain physical distance) of one another, and their detection may therefore be taken as an indication that the devices are within a certain estimated physical proximity (e.g., a certain estimated physical distance) of one another at the time of the detection. In some embodiments, detection of a signal from another mobile electronic device may be noted; in some embodiments, a strength of a signal detected from another mobile electronic device may be noted, such that the signal strength may thereafter be used to inform a calculation of estimated physical proximity (e.g., estimated distance) between the two devices.

In some embodiments, mobile electronic devices in the system may also be configured to actively broadcast one or more signals (for example indicating a MAC address, Beacon ID, AdID, user identifier, and/or other identifier of the device) for other participating mobile electronic devices to detect. In some embodiments, mobile electronic devices 110 may operate as a Bluetooth low-energy (BLE) beacon in order to broadcast information (continuously and/or periodically) about the device's MAC address, AdID, Beacon ID, an identifier identifying the system (e.g., system 100) and/or platform, and/or an identifier for the specific mobile electronic device itself.

Alternatively or additionally, rather than taking the detection itself as an indicator of estimated physical proximity (e.g., physical distance), signals that are detected by a listening device may be used to construct a "signal map" for the listening device, and the signal map may be used to calculate estimation of the listening device's physical proximity (e.g., physical distance) to one or more other electronic devices based on the strength and identity of the signals detected. The signal map may comprise information about the identity, strength, configuration, and timing of signals detected by a mobile electronic device.

Alternatively or additionally still, in some embodiments, the mobile electronic devices may be configured to detect electromagnetic signals emitted by electronic devices that are not mobile electronic devices of another user. For example, a mobile electronic device may detect signals, such as WiFi signals and/or Bluetooth signals, emitted by a WiFi hot-spot or IoT device. In some embodiments, information about signals detected from these devices may be stored (e.g., in a user's signal map and/or in a database of signals data detected by devices in the system) and used to determine a user's physical proximity (e.g., physical distance) to another user. For example, if two users' mobile devices are each connected to the same WiFi hot-spot at the same time, then the system may determine that the users are in close physical proximity (e.g., close physical distance) to one another (e.g., within a distance of at most twice the estimated signal range of the WiFi hot-spot), even if neither of those users' mobile devices detect any signals emitted by one another directly.

In some embodiments, mobile electronic devices 110 may be configured to perform two kinds of signal scans for the purpose of collecting signals to be used in building a database of signal data. First, each mobile electronic device may perform periodic scans for signals, such as ambient WiFi signals and/or Bluetooth signals, emitted by other devices such as WiFi hot spots, IoT devices, or the like. For example, a device may periodically (e.g., every 10 minutes or at any other predetermined interval or in accordance with dynamic triggering) scan ambient WiFi and Bluetooth signals and send signal scan reports along with the device's AdID, user identifier (e.g., UUID), unique BLE identifier, and/or location information to a server associated with data storage and/or contact analysis.

Second, each mobile electronic device may perform continuous (or, in some embodiments, intermittent or periodic) ranging (scans) of BLE signals transmitted by other mobile electronic devices 110. (Each mobile device may itself transmits BLE (Bluetooth Low Energy) signals such that the devices in the system may use phone-to-phone beaconing to detect other nearby devices in the system.) The BLE signals transmitted by those other mobile electronic devices may comprise identifiers identifying the system (e.g., system 100) and/or platform and/or identifying the broadcasting mobile electronic device itself. BLE signals detected by other mobile electronic devices may, in some embodiments, provide more direct information regarding the device generating the BLE signal usable in addition to the information about other (outside the system) mobile electronic devices detected by the first scan described above. In some embodiments, signals detected by one kind of scan may be weighted more heavily than signals detected by the other kind of scan in proximity score calculations and/or risk calculations; for example, BLE signals data from mobile electronic devices within the system may be weighted more heavily than signal data from devices not within the system. BLE signal scan reports (along with the uploading user's AdID and/or UUID and location information) may be sent to the server associated with data storage and/or contact analysis. Upload of BLE signal scan reports and associated information may be performed periodically, such as every 1-2 minutes.

System 100 may further comprise analysis system 120. Analysis system 120 may be any system or server (or plurality of servers) that may communicate with other components of system 100 by electronic network communication. In some embodiments, analysis system 120 may be disposed remotely from one or more of devices 110. In some embodiments, analysis system 120 may include one or more cloud-based systems, or may be provided in whole or in part by one or more cloud-based systems. Analysis system 120 may be configured to execute one or more processes, as explained herein, to receive signal data of one or more mobile devices 110, process the information received, generate and store data structures representing contact networks representing interactions amongst persons and/or entities based on said received information, and analyze said contact network data structures in order to assess levels of distancing and/or interactions amongst groups of people and/or entities.

As shown, analysis system 120 may comprise receiver 121, analysis engine 122, signal database 124, and contact network database 126.

Receiver 121 may comprise any one or more network communication devices configured to receive (e.g., by wired or wireless electronic communication) information regarding interactions amongst devices 110. Specifically, said received information may include signal data detected by individual devices amongst devices 110. (In some embodiments, receiver 121 may receive other information regarding interactions amongst devices 110, including location-based interaction information and/or information regarding exchange of electronic communications or other virtual interactions amongst devices 110.) Furthermore, said received information may include metadata indicating an identity of the device from which the information was received and/or of a person or persons associated with the device. Furthermore, said received information may include location data indicating a location (e.g., geospatial data) at which the uploading device was located when the information regarding interactions was recorded. Information received by receiver 121 may be passed to and/or analyzed by analysis engine 122, as described below.

Analysis engine 122 comprises one or more computer processors that execute instructions to perform any one or more of the techniques disclosed herein, including but not limited to receiving and processing signal data in order to create data structures representing contact networks and to analyze said contact networks.

In some embodiments, analysis system may include one or more computer storage devices storing instructions for performing methods (e.g., contact network analysis methods) as disclosed herein and/or data (e.g., configurations and/or settings for systems and/or devices, historical logs, etc.) regarding one or more analysis system such as system 120; in some embodiments, said instructions and/or data may be stored separately from one or more specific databases described herein.

Signal database 124 may be provided by any one or more suitable computer storage devices included in analysis system 120. Signal database 124 may be configured to store information regarding the received signal data of the one or more mobile devices in 110, such as signal identities, signal types, signal strengths, signal information content, signal duration, and/or time of collection or other metadata regarding signals detected by one or more of devices 110. This data regarding detected signals may be used to determine whether one or more devices (or associated persons) are estimated to have been in contact with (e.g., "proximate to") another device/person.

In some embodiments, signal data may be stored along with associated metadata (e.g., time of detection, time of storage, device type used to collect the data, etc.). In some embodiments signal data may be stored in association with a user identifier such as an identifier used to identify users, devices, or other assets for the purpose of advertisement services (e.g., an AdID and/or a UUID). In some embodiments, signal data may be stored separately from personal information about users (e.g., user name, user address, user demographic information, etc.), such as by maintaining personal information in a separate database.

In some embodiments, the one of more mobile devices 110 may send geolocation information (e.g., device location data) to the analysis system 120, in addition to the signal data. As explained herein, geolocation information may in some embodiments be used for geo-fencing. In some embodiments, system 100 is configured to function only in certain geographic locations, or configured to not function in certain geographic locations. In some embodiments, analysis engine 122 may determine if location data (e.g., GPS data) indicating a location of mobile device 112a is within an approved location for performing signal data upload/logging and analysis (e.g., on company grounds). Analysis engine 122 may determine whether the location associated with mobile device 112a indicates that mobile device 112a was in an approved location for data logging at the time at which one or more signals were detected. Alternately or additionally, analysis engine may determine whether the location associated with mobile device 112a indicates that mobile device 112a was not in a forbidden location for data logging at the time at which one or more signals were detected. In accordance with a determination that data logging is not permissible based on the location data, analysis engine 122a may discard some or all of the information that analysis system 120 received from mobile device 112a. In accordance with a determination that data logging is permissible based on the location data, analysis engine 122 may store some or all of the information that analysis system 120 received from mobile device 112a in signal database 124. In some embodiments, location data may be discarded and not persistently stored regardless of whether geo-fencing criteria are satisfied, and signal data may be persistently stored only when geo-fencing criteria are satisfied.

In some embodiments, geolocation information may be used to apply one or more location criteria in creating a data structure representing a contact network. In some embodiments, contact between two devices may only be recorded (e.g., an edge between the nodes representing the two devices may only be created in the contact network data structure) if one or more location criteria are satisfied. In some embodiments, location criteria may require that the interaction between two devices (e.g., the time at which the two devices exchanged signals, detected common signals, or were otherwise determined to be physically proximate to one another) occurred in a predefined location. In some embodiments, only interactions occurring in a predefined location (e.g., on company grounds, on campus, etc.) may be recorded as part of the contact network, while interactions occurring elsewhere may not be recorded. In some embodiments, multiple different contact networks may be maintained (e.g., different contact networks for different offices of the same corporation or different campuses of the same university), and interactions by a single device may be selectively logged under one contact network or another depending on the location at which the interaction was detected.

Analysis engine 122 is connected to the signal database 124 and may cause signal data to be stored therein and/or may cause signal data therein to be used for creation of a data structure representing a contact network.

In some embodiments, analysis engine 122 retrieves signal data from signal database 124. Analysis engine 122 applies one or more algorithms to the retrieved signal data in order to determine which devices (and/or which associated users) have been in contact with or proximate to one another. Based on these one or more algorithms, engine 122 may generate and store a data structure representing a contact network for a group of devices (e.g., devices 110) and/or for a group of people (e.g., people associated respectively with devices 110). The data structure may represent entities (e.g., electronic devices and/or persons) as nodes and may represent interactions between pairs of entities as edges between the respective pair of nodes representing said entities.

In some embodiments, whether an edge is present between a pair of nodes may be a binary proposition: either the edge exists, representing that interaction has occurred, or the edge does not exist, representing that interaction has not occurred. In some embodiments, determining whether an edge between nodes should exist (e.g., determining whether interaction occurred between two devices or whether two devices had "contact" with one another) may include applying one or more proximity criteria. As used herein, the term proximity criteria may refer to criteria relating to a physical distance of two entities from one another, an amount of time (continuous or total) that two entities have been within a predetermined physical distance of one another, a number of times that two entities have been within a predetermined physical distance of one another, a signal strength of one or more signals exchanged between two devices, a number of common signals detected by two devices, and/or an extent to which signals detected by two devices overlap in one or more signal characteristics (such as those signal characteristics discussed elsewhere herein).

In some embodiments, one or more proximity criteria may be based on the signal data indicating an overlapping set of signals detected by two devices. For example, if two devices each detect an overlapping set of signals with sufficient signal strength within a predetermined time window, then the system may determine that the devices (or associated persons) have been in contact with one another. In some embodiments, the system may determine whether a predefined percentage of overlapped signals, calculated for example using a Jaccard Index, exceeds a predefined threshold; if the predefined threshold is exceeded, then the system may determine that the devices (or associated persons) have been in contact with one another.

In some embodiments, the system may determine whether the signal strength, duration of overlap, temporal spacing of overlap, and/or percentage of overlapping signals exceeds one or more predefined thresholds In some embodiments, analysis engine 122 may apply proximity criteria requiring, for contact to be recorded, that one device observed another other device's unique BLE signal at an RSSI strength greater than a predetermined threshold, (Thresholds may be platform specific, predetermined, dynamically determined, set by users, and/or algorithmically determined.) In some embodiments, to avoid recording that contact occurred due to merely a fleeting interaction, proximity criteria may require a minimum number of strong BLE signals to determine contact occurred.

In some embodiments, for example in addition to proximity criteria and/or location criteria, system 100 (via engine 122) may apply time window criteria when creating a contact network data structure, such that only interactions are determined to have happened within a target time window may be used to create edges in the contact network data structure. In some embodiments, a time-window criteria may be based on an input from a user, such as a request to build a contact network data structure based on interactions taking place over a certain month. In some embodiments, time-window criteria may be used to only log interactions that occur during work hours, during school hours, or the like.

After analysis engine has applied the one or more proximity criteria, location criteria, and/or time window criteria to the signal data in signal database 124 in order to generate a data structure representing a contact network for a group, the generated data structure may be stored in contact network database 126. In some embodiments, Contact network database 126 may be provided by any one or more suitable computer storage devices included in analysis system 120. Contact network database 126 may be configured to store one or more data structures representing one or more respective contact networks for groups. Contact network database 126 may store said data structures with and/or in association with metadata regarding the underlying signal data (or other interactions data) used to create said data structures, location data used to create said data structures, proximity criteria used to create said data structures, location criteria used to create said data structures, and/or any other suitable metadata pertaining to said data structures. Contact network database may be configured such that it can provide a contact network data structure to analysis engine 122, such that analysis engine 122 may analyze said contact network in order to generate a plurality of attributes, metrics, and scores quantifying interactions amongst entities in the group represented by the contact network. Additional explanation of the analysis of said contact network data structures is provided herein, including below with respect to FIG. 3.

System 100 may, in some embodiments, be configured to provide one or more alerts or other outputs based on analysis performed by analysis system 120. For example, in accordance with determining that one or more of the generated scores or metrics do not meet one or more targets (e.g., thresholds), an alert may be generated and transmitted to one or more users of system 100, including by being transmitted to one or more of devices 110. In some embodiments, one or more visualizations of the contact network and/or of the analyses thereof may be generated and displayed, including by being caused to be displayed by one or more of devices 110.

Figure 2:
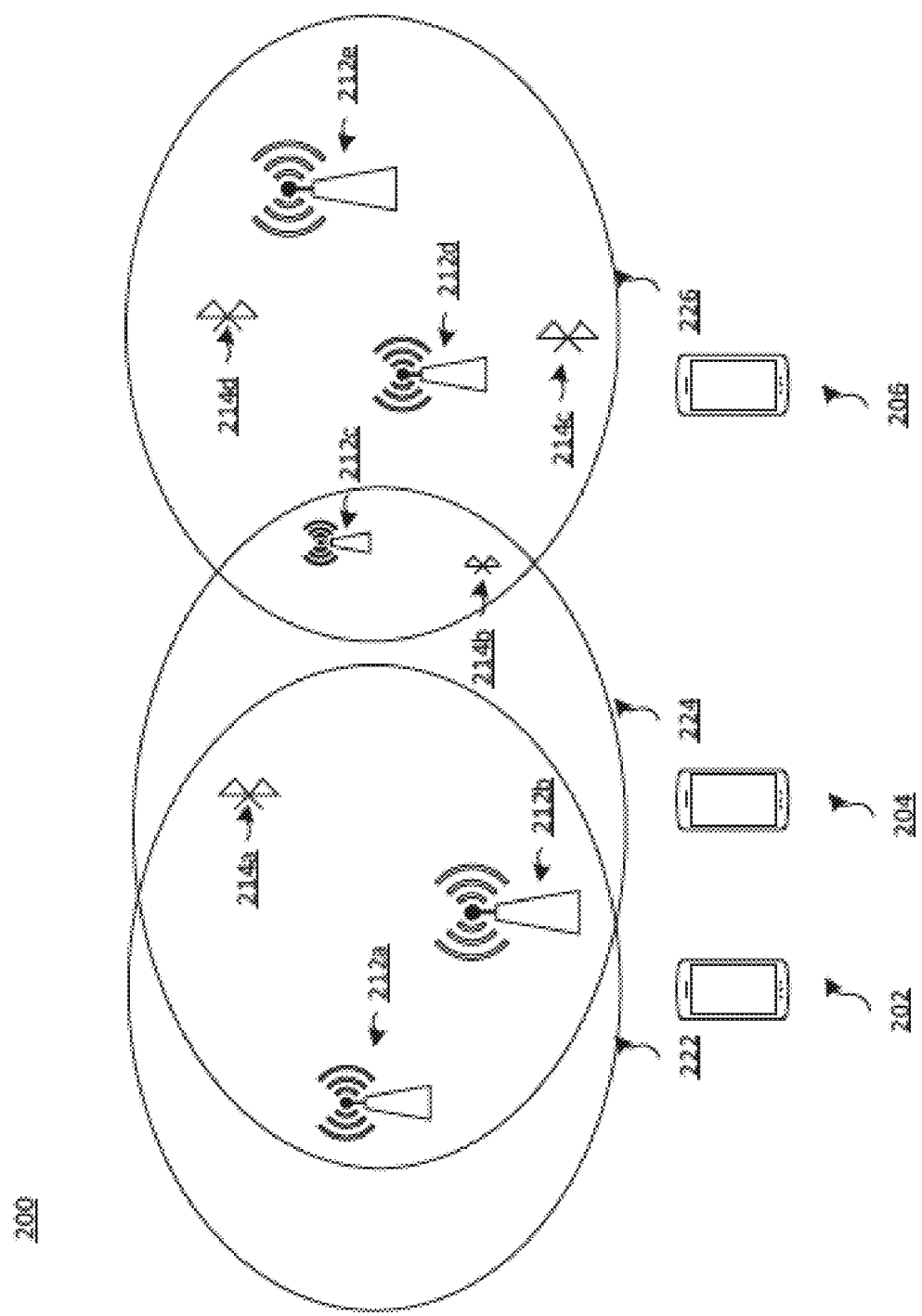
FIG. 2 shows an example of multiple mobile electronic devices deployed in a system for monitoring and quantifying social distancing, in accordance with some embodiments.

FIG. 2 shows an example of multiple mobile electronic devices deployed in system 200 for monitoring and quantifying social distancing, in accordance with some embodiments.

In some embodiments, devices 202, 204, and/or 206 may share any one or more characteristics in common with devices 110 described above with respect to system 100. In some embodiments, system 200 may be configured to collect and upload signal data for use in the creation and/or analysis of one or more data structures representing a contact network of a group of entities (e.g., devices and/or associated persons), for example as described above with respect to system 100.

In the example of FIG. 2, system 200 comprises three mobile electronic devices. Device 202 detects electromagnetic signals in the range 222, including signals from Wi-Fi access points 212a-b, and Bluetooth device 214a. Device B 204 detects electromagnetic signals in the range 224, including signals from Wi-Fi access points 212a-c, and Bluetooth devices 214a-b. Device 206 detects electromagnetic signals in the range 226, including signals from Wi-Fi access points 212c-e, and Bluetooth devices 214b-d.

In the example of FIG. 2, system 200 may determine that the users of device 202 and device 204 have been "in contact" with to one another (e.g., that an edge linking nodes representing devices 202 and 204 should be generated in a data structure representing a contact network), as device 202 and device 204 have both detected signals from Wi-Fi access points 212a-b and Bluetooth device 214a at the same time.

System 200 may determine that contact between devices 204 and device 206 has been less extensive than contact between device 202 and device 204. This determination may be based on device 204 and device 206 detecting a smaller number of overlapping signals (e.g., signals from 212c and 214b but not from other sources). In some embodiments, a system for monitoring and quantifying social distancing may be configured to consider the extent of contact between devices or other entities in creating a contact network data structure. In some embodiments, system 200 may be configured such that it is determined (e.g., in accordance with one or more proximity criteria) that the contact between devices 204 and 206 is sufficient for the creation of an edge linking nodes representing devices 204 and 206; in some embodiments system 200 may be configured such that it is determined (e.g., in accordance with one or more proximity criteria) that the contact between devices 204 and 206 is not sufficient for the creation of an edge linking nodes representing devices 204 and 206.

Finally, system 200 may determine that the users of device 202 and device 206 have not been in contact, as device 202 and device 206 have not detected overlapping electromagnetic signals at the same time (and/or within a predetermined time period of one another).

In some embodiments, device 202 and device 204 may detect Bluetooth signals transmitted by each other with high signal strength, while device 206 may not be able to detect the Bluetooth signals transmitted by device 202 and device 204 or the signal strength is low. This inter-device signal strength may be used in determining an extent of contact/proximity (e.g., determining whether proximity criteria are satisfied) in addition to or alternatively to signal identity, duration of detection, and signal strength detected from other devices.

Figure 3:
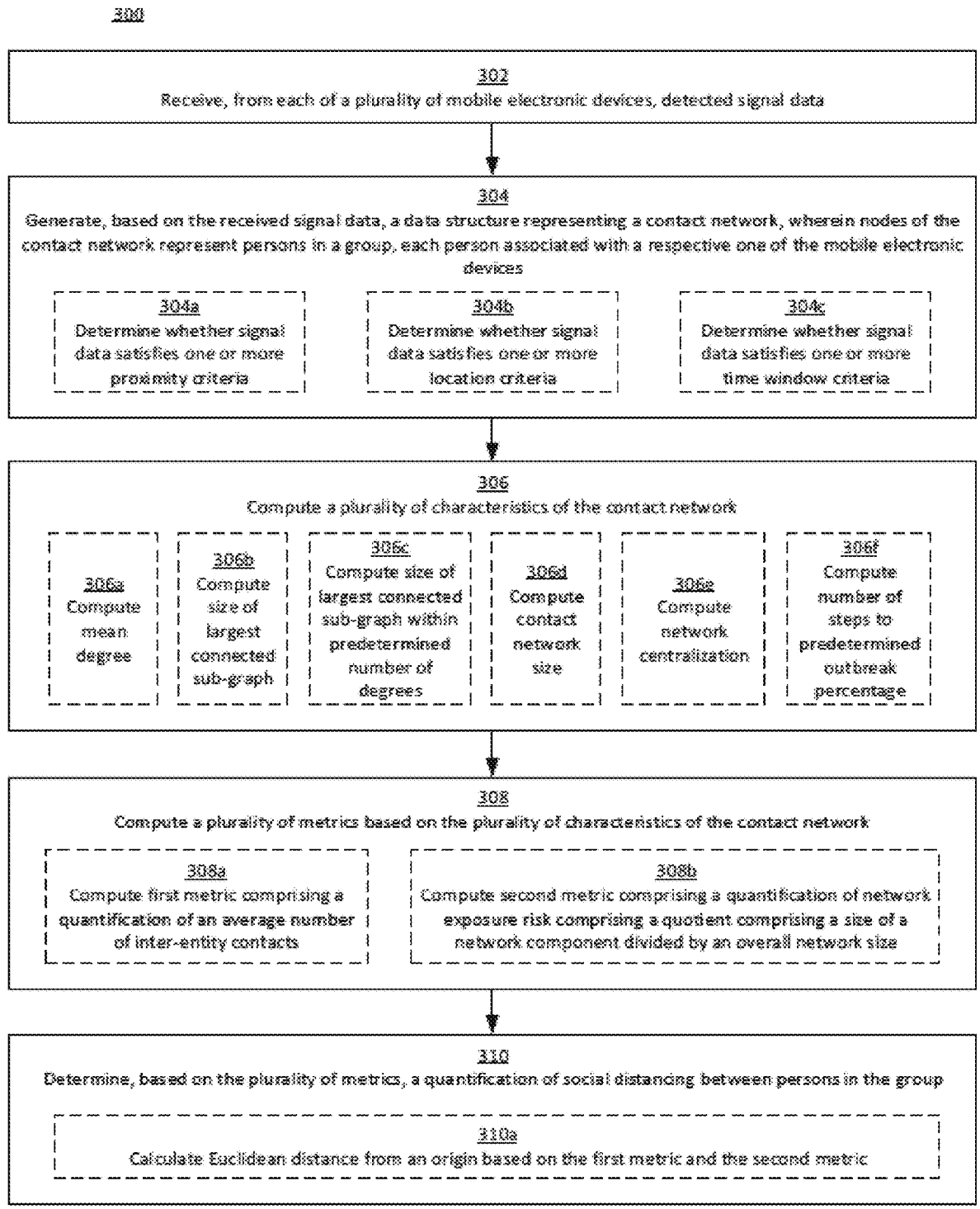
FIG. 3 shows a flowchart showing a method for monitoring and quantifying social distancing, in accordance with some embodiments.

FIG. 3 shows a flowchart showing a method for monitoring and quantifying social distancing, in accordance with some embodiments. In some embodiments, method 300 may be performed by a system such as system 100 as described above with respect to FIG. 1 or system 200 as described above with respect to FIG. 2A.

At block 302, in some embodiments, the system receives, from each of a plurality of mobile electronic devices, detected signal data. As described herein, the revived signal data may include information about signal identity, signal type, signal strength, signal information content, signal duration, and/or time of collection or other metadata regarding one or more signals detected by any one or more of the plurality of mobile electronic devices. This data regarding detected signals may be used to determine whether one or more devices (or associated persons) are estimated to have been in contact with (e.g., "proximate to") another device/person.

In the example of system 100, receiver 121 of analysis system 120 may receive detected signal data from mobile electronic devices 110. In the example of system 100, the mobile electronic devices 110 may detect a plurality of electromagnetic signals. As described above, said signals may be emitted by other users' mobile electronic devices. Said electromagnetic signals, such as WiFi signals and/or Bluetooth signals, may only be able to be detected when the emitting device and the listening device are within a certain physical proximity (e.g., certain physical distance) of one another. The detection of said electromagnetic devices may therefore be taken as an indication that the devices are within a certain estimated physical proximity (e.g., certain physical distance) of one another at the time of the detection. In some embodiments, detection of a signal from another mobile electronic device may be noted; in some embodiments, a strength of a signal detected from another mobile electronic device may be noted, such that the signal strength may thereafter be used to inform a calculation of estimated physical proximity (e.g., estimated physical distance) between the two devices.

As described elsewhere herein, signals may be collected from other mobile electronic devices (e.g., amongst participating devices) and/or from electronic devices that are not mobile electronic devices of another user. For example, a mobile electronic device may detect signals, such as WiFi signals and/or Bluetooth signals, emitted by a WiFi hot-spot or IoT device. In some embodiments, information about signals detected from these devices may be stored (e.g., in a user's signal map and/or in a database of signal data detected by devices in the system) and used to determine whether two entities have been in contact with one another. For example, if two users' mobile devices are each connected to the same WiFi hot-spot at the same time, then the system may determine that the users are in a certain physical proximity to one another (e.g., within a distance of at most twice the estimated signal range of the WiFi hot-spot), even if neither of those users' mobile devices detect any signals emitted by one another directly. In some embodiments, the system may be configured to leverage one or more fixed electronic devices aside from a mobile electronic device as a hub for the purposes of signal data collection. For example, in addition to enabling mobile electronic devices to broadcast identity information and to listen for signals emitted by other devices, the system may alternatively or additionally enable one or more fixed electronic devices to broadcast identity information and/or to listen for signals emitted by other devices. Fixed electronic devices may include, for example, desktop computers, WiFi hot spots, routers, AV equipment, IOT devices, or the like; in some embodiments, a fixed electronic device may be identified based on a Wireless AP MAC ID, rather than a device UUID or AdID. In this manner, fixed electronic devices may collect signal data that may be used for creating data structures representing contact networks. In this way, contacts between pairs of human users associated with respective mobile electronic devices may be monitored.

The system may store a record of the received signal data. In the example of system 100, the signal data and related metadata may be stored in signal database 124. In some embodiments, data collected during collection of signal data signals may include one or more of:

Mobile device information (e.g., phone manufacturer and model; mobile OS identity and/or version; contact tracing application name and/or version; GPS coordinates (for geofencing purposes only); and/or Mobile App-generated unique identifier assigned to user's device to identify device for contact tracing);

Signal data (e.g., observed WiFi/Bluetooth MAC addresses, SSIDs, BLE UUIDs, Major and Minor (BLE identifiers), BLE RSSI (Receiver Signal Strength Indicators), and/or Longitude/Latitude information, including time of detection and/or other metadata for any of said data);

Analytics data (e.g., performance monitoring and cookie data); and

Diagnostic data (e.g., periodic battery and cellular connectivity status updates to help diagnose device performance issues).

In some embodiments, the signal data may be uploaded for storage in a database by WiFi connection or by other internet connection. In some embodiments, the signal data may be stored along with associated metadata. The metadata may include, for example, time of detection, time of storage, device type used to collect the data, etc.

In some embodiments, signal data may be stored in association with a user identifier such as an identifier used to identify users, devices, or other assets (e.g., a device UUID). (In some embodiments, an identifier may be an identifier used for the purposes of advertisement services, such as an AdID.) In some embodiments, signal data may be stored separately from personal information about users (e.g., user name, user address, user demographic information, etc.), such as by maintaining personal information in a separate database (e.g., database 136). In some embodiments, signal data may be maintained by a third-party service and/or segregated infrastructure that does not have access to user personal information, in order to increase user privacy. As used herein, upload and storage of signal data may refer to upload and storage of data regarding detected signals (e.g., signal identity, signal content, signal type, signal strength, time of detection).

In some embodiments, signals that are detected may be used to construct a "signal map" for a device, and the signal map may be used to calculate an estimation of the device's physical proximity (e.g., physical distance) to one or more other electronic devices based on the strength and identity of the signals detected. The signal map may comprise information about the identity, strength, configuration, and timing of signals detected by a mobile electronic device. In some embodiments of the example of system 100, a signal map may be stored in database 124.

As described above, in some embodiments, the system may be configured to be geo-fenced. In some embodiments in which the system is geo-fenced, the system is configured such that mobile electronic devices gather and upload signal data regardless of location, but that the signal data is uploaded along with location data indicating a location of the uploading mobile electronic device, such that the signal data may be stored (or used for generation of one or more contact networks) only when the location data indicates that the uploading mobile electronic device is in an approved area (e.g., on company grounds). In some embodiments in which location data is uploaded for the purposes of verifying that location criteria are met, the uploaded location data may be deleted and may not be stored persistently by the system (regardless of whether the location data indicates at location criteria are met).

In some embodiments, in addition to or alternatively to enforcing geo-fencing at the data storage stage as described above, the system may enforce geo-fencing at the data broadcast stage and/or the data collection stage, such that signals for use in the system (e.g., BLE and/or RSSI) may only be broadcast when it is first determined based on location data that location criteria are satisfied, or such that signal data may only be detected and/or recorded at the mobile electronic device when it is first determined based on location data that location criteria are satisfied.

In some embodiments, one or more additional criteria, in addition to location criteria, may be applied before a device broadcasts information, a device detects or uploads information, or the system stores information. For example, in some embodiments, a mobile electronic device may only broadcast and/or detect information for use in the system when an application associated with the system is actively running on the device. In some embodiments, a mobile electronic device may only collect information if the device is determined to be in a location having sufficient LTE-M coverage to allow for signal data backhaul at a predefined minimum frequency (e.g., at least once per day).

At block 304, in some embodiments, the system generates, based on the received signal data, a data structure representing a contact network, wherein nodes of the contact network represent persons in a group, each person associated with a respective one or the mobile electronic devices. A data structure representing a contact network may be a data structure that represents a group of entities in a contact network, wherein each entity is represented as a node, and wherein contact between pairs of entities are represented as edges linking pairs of nodes.

Nodes representing entities that have not had contact with one another may not be linked by an edge, while nodes representing entities that have had contact with one another may be linked by an edge. In some embodiments, the system may apply one or more criteria in order to determine, based on the received signal data, whether two entities have had sufficient contact with one another such that an edge should be generated in the contact network data structure linking the nodes for the two entities. In some embodiments, criteria for whether an edge should be generated (e.g., whether it is determined that two entities were "in contact" with one another) may include proximity criteria, location criteria, and time window criteria.

At block 304a, in some embodiments, generating the data structure representing a contact network comprises determining whether signal data satisfies one or more proximity criteria. As used herein, the term proximity criteria may refer to criteria relating to a physical distance of two entities from one another, an amount of time (continuous or total) that two entities have been within a predetermined physical distance of one another, a number of times that two entities have been within a predetermined physical distance of one another, a signal strength of one or more signals exchanged between two devices, a number of common signals detected by two devices, and/or an extent to which signals detected by two devices overlap in one or more signal characteristics (such as those signal characteristics discussed elsewhere herein). In some embodiments, proximity criteria may include any or all of the proximity criteria described above with respect to FIG. 1.

At block 304b, in some embodiments, generating the data structure representing a contact network comprises determining whether signal data satisfies one or more location criteria. As used herein, the term location criteria may refer to criteria relating to a location at which interaction data (e.g., signal data) was detected. For example, location criteria may be applied to determine whether location data associated with signal data indicates that the signal data was detected at a location where data logging is permitted (and the signal data may be ignored and/or discarded if it was not detected at a permitted location). In some embodiments, location criteria may be used to determine which of a plurality of contact networks an interaction should be recorded under. For example, if two employees of an organization both work in both a New York and Boston office, and location data indicates that the employee's devices detected signals from one another when located in New York, then a link between nodes representing the employees may be recorded in a contact network data structure for the New York office, while a link between nodes representing the employees may not be recorded in a contact network data structure for the Boston office. In some embodiments, location criteria may include any or all of the location criteria described above with respect to FIG. 1.

At block 304c, in some embodiments, generating the data structure representing a contact network comprises determining whether signal data satisfies one or more time window criteria. As used herein, the term time window criteria may refer to criteria relating to a time window during which interaction data (e.g., signal data) was detected. For example, time window criteria criteria may be applied to determine whether time data associated with signal data indicates that the signal data was detected at a time when data logging is permitted (and the signal data may be ignored and/or discarded if it was not detected at a permitted time). In some embodiments, time window criteria may be used to determine which of a plurality of contact networks an interaction should be recorded under. In some embodiments, for example, logging of interactions may only be permitted during business hours. Thus, if two employees' devices detected signals from one another during business hours, then a link between nodes representing the employees may be recorded in a contact network data structure; however, if the employees' devices detected signals from one another outside business hours, then a link between nodes representing the employees may not be recorded in the contact network data structure. In some embodiments, time window criteria may include any or all of the time window criteria described above with respect to FIG. 1.

In some embodiments, whether an edge is present in the data structure between a pair of nodes may be a binary proposition, such that an edge may only be generated if all contact criteria are satisfied. In some embodiments, an edge may be generated if some but not all criteria are satisfied, and data indicating which criteria are or are not satisfied may be stored as part of the data structure. In some embodiments, edges may be associated with a plurality of variables and/or one or more weights/scores that are based on which criteria are satisfied by interaction between the linked entities and/or based on how extensive interaction between the linked entities is determined to have been.

In the example of system 100, analysis engine 122 may generate a contact network data structure based on the signal data stored in signal database 124, and the generated data structure may be stored in contact network database 126.

At block 306, in some embodiments, the system computes a plurality of characteristics of the contact network. After the data structure representing the contact network has been generated and stored based on the collected signal data (or other collection interaction data), the system may analyze the contact network data structure in order to generate, store, transmit, display, and/or otherwise output a plurality of characteristics of the contact network. As described herein, the characteristics of the contact network that are computed may be used to automatically trigger one or more automated actions, may be used to generate one or more reports or alerts, and/or may be used to generate one or more visualizations for display.

At block 306a, in some embodiments, computing the plurality of characteristics of the contact network comprises computing a mean degree of the contact network. In some embodiments, mean degree of a contact network may be calculated such that it represents the average number of other entities that each entity in the contact network is connected to. In some embodiments, mean degree may be calculated as twice the total number of edges in the contact network divided by the total number of nodes in the contact network.

At block 306b, in some embodiments, computing the plurality of characteristics of the contact network comprises computing a size of a largest connected sub-graph of the contact network. In some embodiments, this characteristic sub-graph may be referred to as a "giant component." In some embodiments, this largest connected sub-graph may be defined as the largest connected sub-graph in which nodes are interconnected by any number of degrees. The size of the largest connected sub-graph may be the number of nodes contained therein.

In the context of infectious disease transmission, the size of the largest connected sub-graph may represent an estimated largest outbreak that could occur from a single initial point of infection via recorded contact pathways, assuming that all contacts represented in the network lead to disease transmission, regardless of the number of transmission steps.

At block 306c, in some embodiments, computing the plurality of characteristics of the contact network comprises computing a size of a largest connected sub-graph of the contact network within a predetermined number of degrees. In some embodiments, this characteristic sub-graph may be referred to as a "largest component." In some embodiments, this largest connected sub-graph within a predetermined number of degrees may be defined as the largest connected sub-graph in which nodes are interconnected by the predetermined number of degrees (e.g., by two degrees, three degrees, five degrees, etc.). The size of this largest connected sub-graph within a predetermined number of degrees may be the number of nodes contained therein.

In the context of infectious disease transmission, the size of the largest connected sub-graph within a predetermined number of degrees may represent an estimated largest outbreak that could occur from a single initial point of infection via recorded contact pathways, assuming that all contacts represented in the network lead to disease transmission up to but not including a number of transmission steps equal to the maximum predetermined number of degrees. For example, if the number of degrees used is two, then the size of this component may represent the largest outbreak that could occur if one individual infected all of their close contacts, and all of their close contacts then went on to in turn infect all of their close contacts.

At block 306d, in some embodiments, computing the plurality of characteristics of the contact network comprises computing a contact network size (e.g., an overall size of the contact network). The overall contact network size may be the number of nodes contained therein.

At block 306e, in some embodiments, computing the plurality of characteristics of the contact network comprises computing a network centralization of the contact network. In some embodiments, a network centralization may comprise a quantification (e.g., a score) and/or a characterization (e.g., by classifying into one of a plurality of predefined centralization categories (e.g., highly-centralized, moderate, or not highly centralized)) of the extent to which the contact network dominated by one central user. In some embodiments, network centralization may be calculated as (or calculated based on) the variance in degree centrality (where degree centrality may be defined as the number of edges each node has).

At block 306f, in some embodiments, computing the plurality of characteristics of the contact network comprises computing a number of steps required to reach a predetermined outbreak percentage for the contact network. While this characteristic uses the term "outbreak" to refer to the minimum number of steps required to achieve coverage across the predetermined percentage of network nodes, it should be understood the a minimum number of steps to achieve coverage across the predetermined percentage of network nodes may be computed in other contexts unrelated to infectious disease outbreaks. For example, the minimum number of steps could represent a minimum number of steps required for information to be disseminated to a predetermined percentage of network nodes.

The minimum number of steps required may be calculated as the minimum number of steps required from any single node in the contact network such that, if all of the N-degree contacts of that node are infected (or otherwise included in the count) the total number of infected (or counted) nodes will equal or exceed a predetermined percentage of all nodes in the contact network. In the context of infectious disease outbreaks, this characteristic may give a measure of the rate at which an outbreak could travel through a network.

In some embodiments, in addition or alternatively to computing the minimum number of steps required from any single node in the contact network to achieve overall network coverage equaling a predetermined percentage, the system may compute the average (or median) number of steps required to achieve overall network coverage equaling the predetermined percentage. This characteristic may give a measure of the rate at which an outbreak could travel through a network, assuming a random starting point in the network.

In some embodiments, the one or more computed characteristics may be stored on any suitable storage medium of the system. In the example of system 100, analysis engine 122 may compute the plurality of characteristics based on a contact network data structure stored on contact network database 126, and may store the computed characteristics on any suitable storage medium of analysis system 120. As described below, the computed characteristics may thereafter be used by the system (e.g., by analysis engine 122) to compute a plurality of metrics that can be used in characterizing the amount of social distancing and/or the extent of contact amongst entities in the group.

At block 308, in some embodiments, the system computes a plurality of metrics based on the plurality of characteristics of the contact network. After the plurality of underlying characteristics of the contact network have been calculated, the system may use the underlying characteristics to compute a plurality of metrics based thereon. These metrics may include metrics that are more advanced and/or more complex as compared to the underlying network characteristics. In some embodiments, the system may generate, store, transmit, display, and/or otherwise output the plurality of metrics. In some embodiments, the plurality of metrics may be stored, transmitted, displayed, and/or otherwise output separately from the underlying characteristics; for example, a user may choose to view only the metrics and not the underlying characteristics. As described herein, the metrics that are computed may be used to automatically trigger one or more automated actions, may be used to generate one or more reports or alerts, and/or may be used to generate one or more visualizations for display.

At block 308a, in some embodiments, computing the plurality of metrics comprises computing a first metric comprising a quantification of an average number of entities within the contact network with which an entity in the contact network will have contact in a predetermined amount of time. (In some embodiments, the first metric may additionally or alternatively be computed and stored as an average rate of inter-entity contacts.) In some embodiments, this first metric may be referred to as a "close contact score" or "average close contacts." In some embodiments, this first metric may be computed based on the mean degree, which as explained above may represent the average number of other entities that each entity in the contact network is connected to and may be calculated as twice the total number of edges in the contact network divided by the total number of nodes in the contact network.

In some embodiments, the first metric may be computed as being exactly equal to the mean degree. For example, if a contact network is generated based on data collected over the course of a week, then a number of contacts expected for an average user over the course of one week may be computed as being exactly equal to the mean degree of the contact network.

In some embodiments, the first metric may be computed based on, but not as exactly equal to, the mean degree. For example, if a contact network is generated based on data collected over a one week, then a number of contacts expected for an average user over the course of one month may be calculated as greater than the mean degree of the contact network. The number of contacts expected over a different time period than the length of time over which underlying data was collected may be extrapolated based on any suitable technique used to predict the increase in number of contacts over time, including by modeling based on observed patterns of growth over time for mean degree in other contact networks monitored over time.

In some embodiments, the first metric may be computed based on the mean degree by calculating the mean degree after eliminating one or more outlier nodes. In some embodiments, the first metric may be calculated based on a median degree or based on a mode, for example in a similar manner as the manner(s) discussed above with respect to calculation based on a mean degree.

At block 308b, in some embodiments, computing the plurality of metrics comprises computing a second metric comprising a quantification of network exposure risk. In some embodiments, the second metric comprises a structural measure that approximates the maximum size of an outbreak. In some embodiments, the second metric may be scaled to within a predetermined score range, for example by being scaled between 0 and 1.

In some embodiments, the quantification of network exposure risk comprises a quotient comprising a size of a contact-network component divided by an overall contact-network size. In some embodiments, the contact network component size (included in the numerator of the quotient) may be a size of a largest connected sub-graph of the contact network (e.g., a "giant component" size), for example as explained above with reference to block 306b. In some embodiments, the contact network component size (included in the numerator of the quotient) may be a size of a largest connected sub-graph of the contact network within a predetermined number of degrees (e.g., a "largest component" size), for example as explained above with reference to block 306c.

In some embodiments, the one or more computed metrics may be stored on any suitable storage medium of the system. In the example of system 100, analysis engine 122 may compute the plurality of metrics based on the plurality of underlying characteristics, and may store the computed metrics on any suitable storage medium of analysis system 120. As described below, the computed characteristics may thereafter be used by the system (e.g., by analysis engine 122) to determine a quantification of social distancing between persons or entities represented by the contact network data structure.

At block 310, in some embodiments, the system may determine, based on the plurality of metrics, a quantification of social distancing between persons (or entities) in the group. After the plurality of metrics have been calculated, the system may use the metrics to determine an extent to which the group represented by the contact network is or is not engaging in social distancing practices. Making this determination may include computing a quantification of social distancing for the group. In some embodiments, making this determination may include computing an overall social distancing score for the contact network. In some embodiments, the system may generate, store, transmit, display, and/or otherwise output information regarding the determination, including the quantification/score of social distancing for the contact network. In some embodiments, a quantification of social distancing may be stored, transmitted, displayed, and/or otherwise output separately from the underlying characteristics and/or from the underlying metrics; for example, a user may choose to view only the overall social distancing score and not the underlying metrics or characteristics. As described herein, the social distancing quantification that is computed may be used to automatically trigger one or more automated actions, may be used to generate one or more reports or alerts, and/or may be used to generate one or more visualizations for display.

At block 310a, in some embodiments, determining the quantification of social distancing comprises calculating a Euclidean distance from an origin based on the first metric and based on the second metric.

In some embodiments, a social distancing quantification may be calculated as a combination of the two or more of the plurality of underlying metrics (e.g., the first metric and the second metric). In some embodiments, the social distancing quantification may be scaled such that it yields a normalized score between predetermined values, such as between 0 and 100. In some embodiments, the social distancing quantification may be calculated as a distance (e.g., Euclidean distance) of a point from an origin in two dimensions, wherein the position of the point is defined in one dimension based on the first metric and in another dimension based on the second metric. (In some embodiments, if three metrics are used, then a distance from the origin in three dimensions may be used.) For example, the location of the point may be defined by two coordinates in two-dimensional space, wherein the first coordinate is based on the first metric and the second coordinate is based on the second metric.

In some embodiments, the social distancing score may be given by the following formula:

$$S = 100 \frac{\sqrt{\left(\frac{\min(A, \alpha)}{\alpha}\right)^2 + p^2}}{\sqrt{2}} \quad (1)$$

where:
S is the social distancing score for the contact network;
A is an average close contact score for the contact network, e.g., a quantification of an average number of entities within the contact network with which an entity in the contact network will have contact in a predetermined amount of time, for example as described above with respect to block 308a;

α is a maximum close contact parameter, which may be chosen such that it represents a maximum number of contacts considered acceptable for a given time period, for a given group of entities, and for a given use case (e.g., in the case of infectious disease outbreak risk mitigation, a permissible number of contacts per time period may be set in accordance with disease characteristics of a certain pathogen including transmissibility, incubation period, and length of time over which a carrier is contagious); and p is a potential network exposure, e.g., a structural measure that approximates the maximum size of an outbreak, e.g., a quotient comprising a size of a contact-network component divided by an overall contact-network size, for example as described above with reference to block 308b. Using this equation, 0 represents a location where both the average close contacts and the potential network exposure is zero, and 100 represents a location where both the potential network exposure (p) is equal to the size of the entire contact network and where the average close contact score (A) is at or above the determined threshold (α).

In some embodiments, the social distancing quantification may be used to automatically trigger one or more automated actions, may be used to generate one or more reports or alerts, and/or may be used to generate one or more visualizations for display. For example, in some embodiments, the system may take one or more actions in response to determining that the social distancing quantification does not meet a target or goal (e.g., a threshold value). For example, in some embodiments, in response to determining that the social distancing quantification does not meet a target, a notification may be sent to one or more users indicating that the social distancing target has not been met, including by sending a notification to one or more of the devices from which signal data was collected (e.g., devices 110 in system 100).

Method 300, as described above, contemplates that signal data may be collected by user's mobile electronic devices based, in part, on direct detection of other user's mobile electronic devices (e.g., smartphones), such that a single device (e.g., smartphone) may serve to both broadcast and collect data. In some embodiments, additionally or alternatively, systems such as those described herein may leverage personal beacon devices that may be separate from a detection device (e.g., separate from a smartphone device). In some embodiments, a personal beacon device may be a dedicated broadcast device that serves to broadcast signals but not to detect, collect, or record signals. In some embodiments, a personal beacon device may be associated with a device ID (e.g., UUID) and may be associated with a beacon session in the system, linking the personal beacon device to a user's identity and to a personal beacon BLE UUID. As a person carrying the personal beacon device navigates the monitored environment (e.g., an organization's geo-fenced sites), existing mobile electronic device applications may observe the personal beacon by detecting the signals that are broadcast from the personal beacon, said signals including BLE UUID and/or and RSSI. Those detected signals may be uploaded by the detecting devices (optionally subject to location criteria) for storage in a signal database and for use in generating a contact network as described herein.

Figure 4:
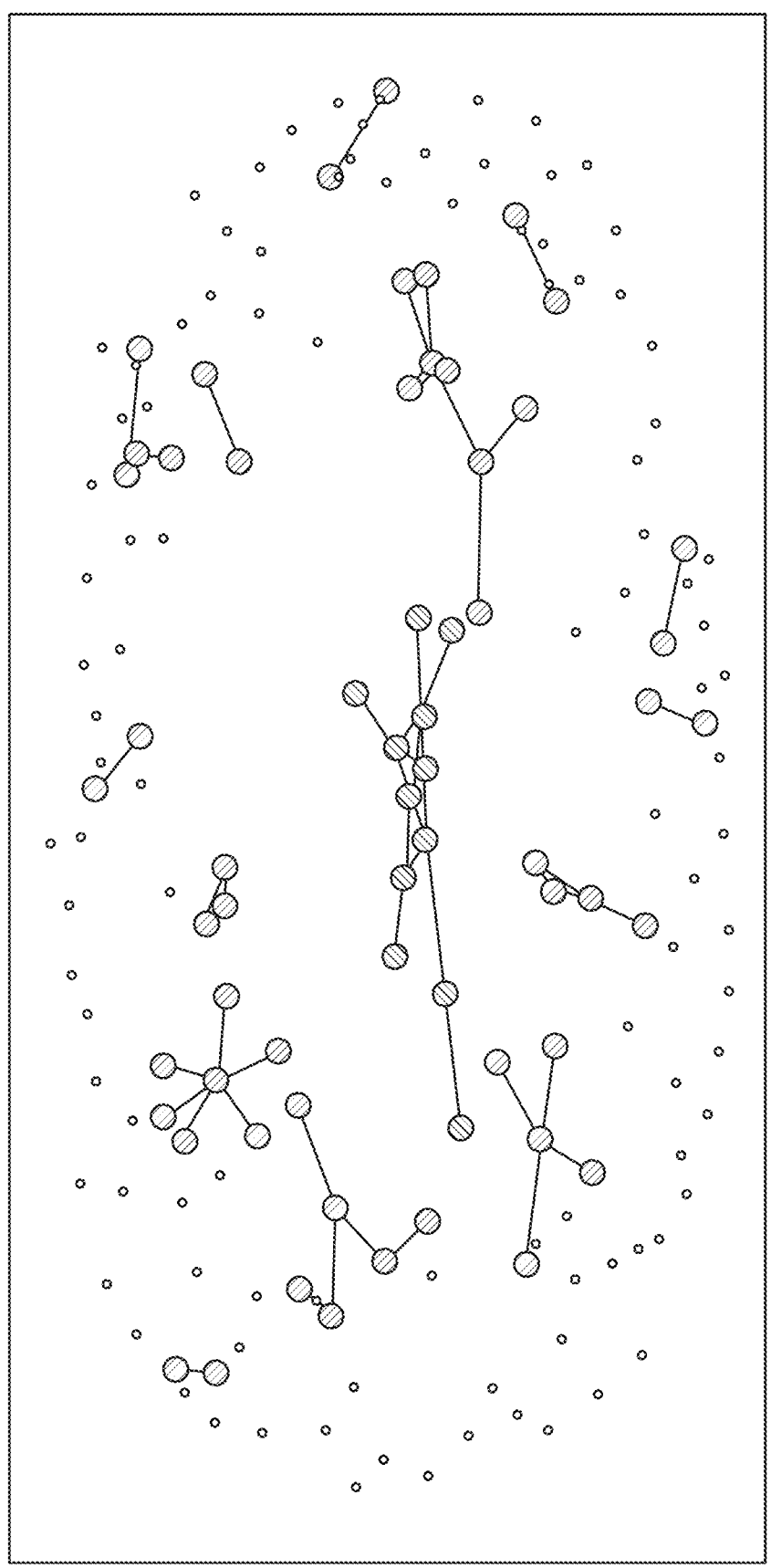
FIG. 4 shows a visualization of a contact network, in accordance with some embodiments.

FIG. 4 shows a visualization of a contact network, in accordance with some embodiments. In FIG. 4, nodes in the contact network are represented as small gray dots, large red dots, or large blue dots. The small gray dots represent nodes for which no contacts have been recorded, and thus for which no edges linking said nodes to any other nodes are present. The large red dots and the large blue dots represent nodes for which one or more inter-entity contacts have been recorded, and thus for which one or more edges are present linking the nodes to one or more other nodes. The large blue dots represent nodes that form the largest connected subgraph (e.g., the "giant component") of the contact network.

In some embodiments, a visualization such as the visualization shown in FIG. 4 may be generated by a system (e.g., system 100) and may be caused to be transmitted to and/or displayed by one or more systems, including by being transmitted to and/or displayed by one of the devices from which signal data was collected (e.g., one or devices 110).

Figure 5:
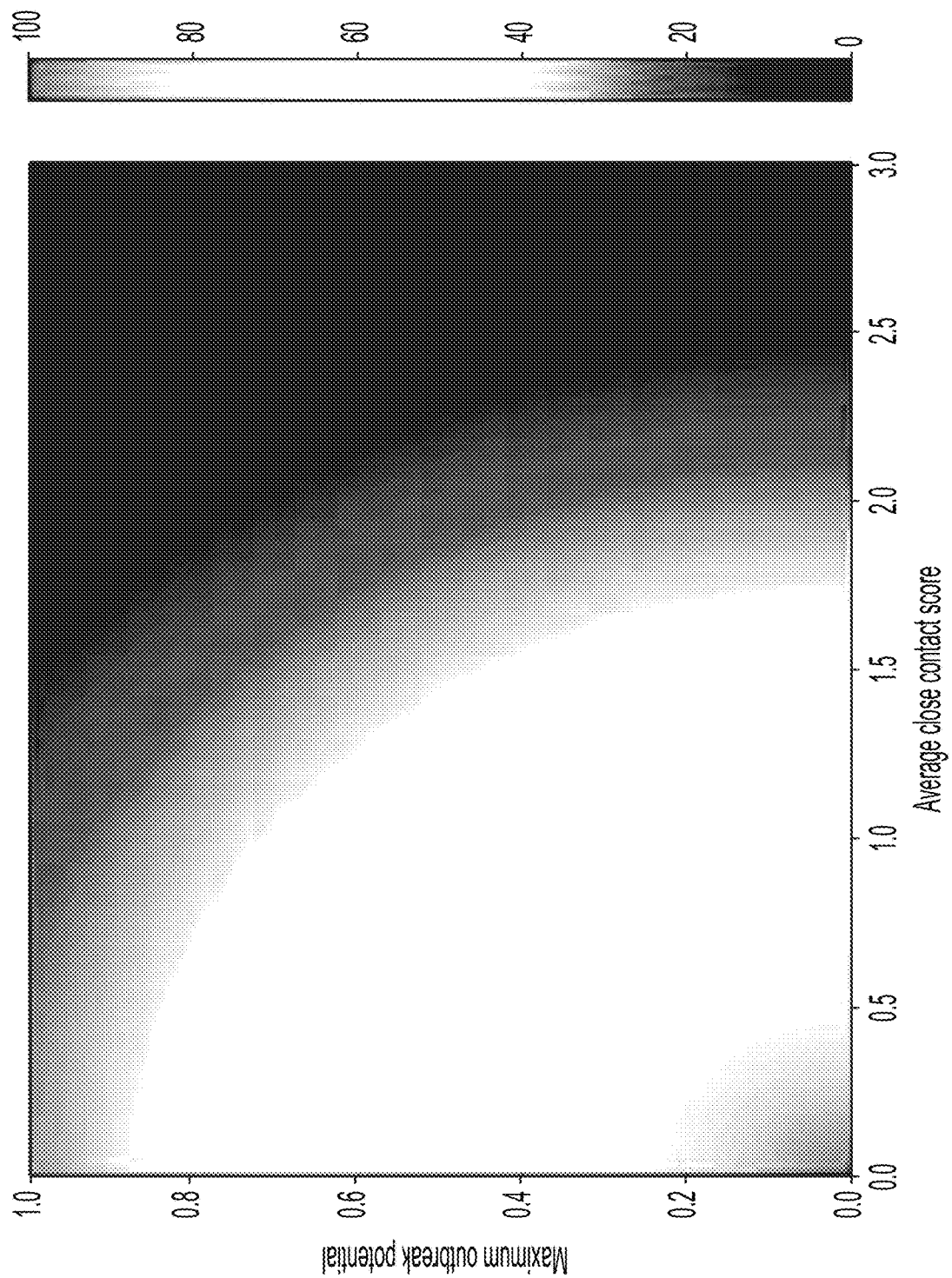
FIG. 5 shows a visualization of a social distance score calculation, in accordance with some embodiments.

FIG. 5 shows a visualization of a social distance score calculation, in accordance with some embodiments. The visualization of FIG. 5 shows how a social distance score may be calculated as a distance (e.g., a Euclidean distance) from an origin. In the example shown in FIG. 5, the heat map depicts a social distance score calculation that is consistent with Equation (1) described above, in which the score is calculated as a distance of a point from an origin in two dimensions, wherein the position of the point is defined in one dimension based on an average close contact score and in another dimension based on a maximum outbreak potential score.

In some embodiments, a visualization such as the visualization shown in FIG. 5 may be generated by a system (e.g., system 100) and may be caused to be transmitted to and/or displayed by one or more systems, including by being transmitted to and/or displayed by one of the devices from which signal data was collected (e.g., one or devices 110). In some embodiments, a social distance score for one or more contact networks may be plotted on a het map such as the one shown in FIG. 5, which may allow a user to easily visually compare social distance scores for various contact networks.

While the descriptions in this disclosure have focused primarily on systems in which data regarding interactions between entities is gleaned based on signal data emitted by and/or detected by a fleet of mobile electronic devices moving throughout an environment, the techniques described herein may be applied in other systems that leverage alternative or additional techniques for determining when contact has occurred between two monitored entities. For example, rather than using signal data to determine when two entities (e.g., two persons and/or two mobile devices) have been in close physical proximity to one another, a system may use location surveillance to monitor the locations of entities over time, and to determine that entities located in the same location at the same time have been in proximity to one another and therefore have been "in contact" with one another. Below, FIG. 6 shows an example of one such system.

Figure 6:
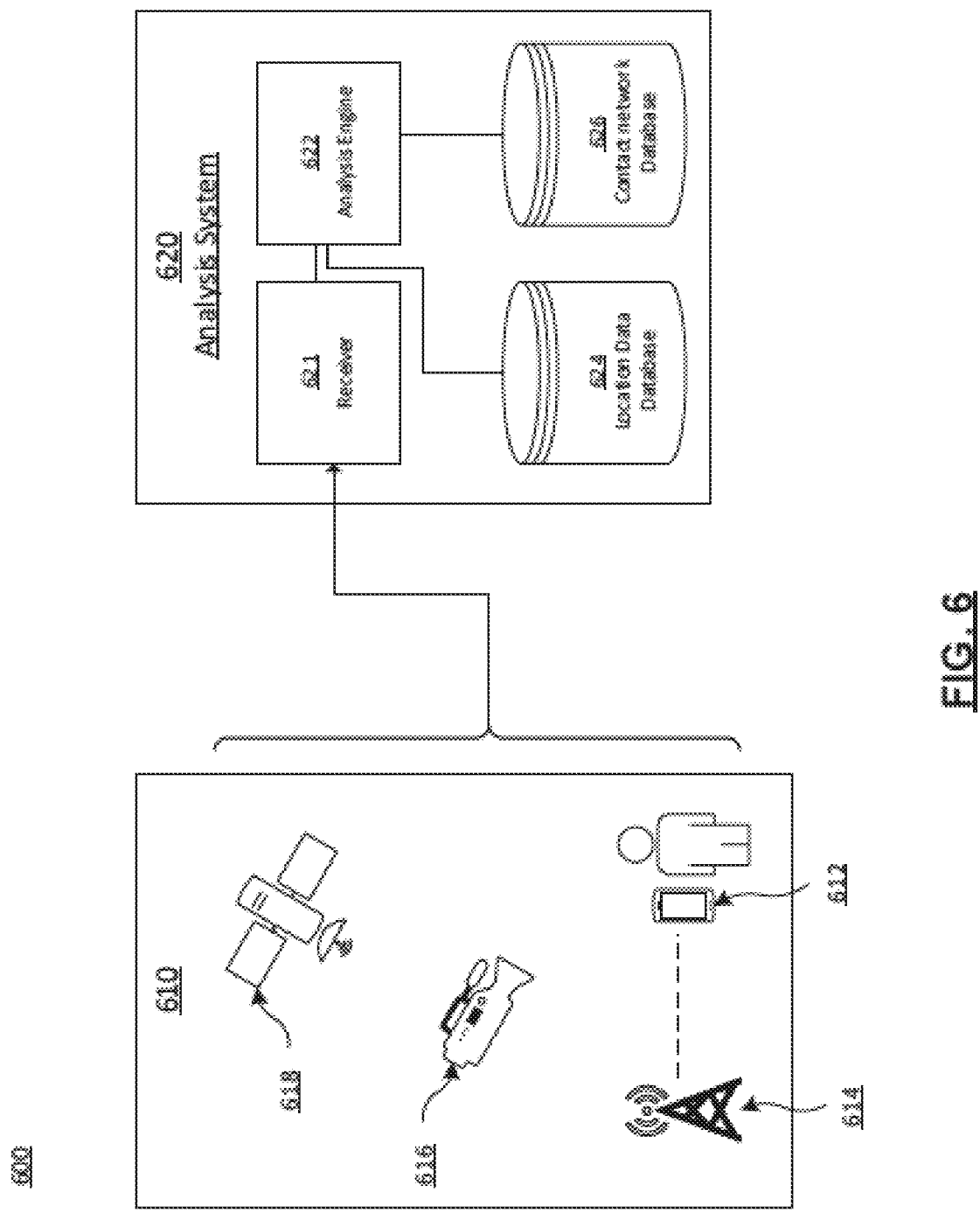
FIG. 6 shows a schematic representation of a system for monitoring and quantifying social distancing, in accordance with some embodiments.

FIG. 6 shows a schematic representation of a system 600 for monitoring and quantifying social distancing, in accordance with some embodiments. System 600 may share any one or more characteristics in common with system 100 described above with respect to FIG. 1. System 600 comprises analysis system 620 which includes receiver 621, analysis engine 622, and contact network database 626. Analysis system 620 and its components 621, 622, and 626 may share any one or more characteristics in common with analysis system 120 and its components 121, 122, and 126 described above with respect to system 100 in FIG. 1.

System 600 may differ from system 100 in that, rather than (or in addition to) being configured to collect signal data from a fleet of mobile electronic devices 110 and to store said data in signal data database 124, system 600 may be configured to collect location data from one or more of a plurality of location sensors 610 and to store said location data in location data database 624. Analysis engine 622 may then use said location data to determine which entities were located in a same or similar location at a same or similar time, and to determine which entities have been "in contact" with one another on that basis. This determination may be used to generate data structures representing contact networks as described elsewhere herein, which may be analyzed as described elsewhere herein.

As shown in FIG. 6, location sensors 610 may include mobile electronic device 612 which may determine a geolocation for the device using any suitable geolocation technique. Location sensors 610 may include antenna 614, which may be a fixed device that determines a location of a mobile electronic device (e.g., device 612) by detecting one or more signals emitted by the mobile electronic device and thereby determining that the mobile electronic device is located proximate to the fixed location of antenna 614. Antenna 614 may be, for example, a cellular tower. Location sensors 610 may include camera system 616, which may determine a location of a person (and/or a device, e.g., device 612) based on optically tracking the entity in photographs or video. Finally, location sensors 610 may include remote geolocation system 618, which may determine a geolocation for a mobile electronic device (e.g., device 612) using any suitable geolocation technique. Additional or alternative location sensor systems may be used. In some embodiments, location data gathered by any one of the location sensors 610 may be uploaded directly or indirectly from said sensor 610 to receiver 621 for use by analysis system 620.

While the descriptions in this disclosure have focused primarily on systems in which data regarding physical interactions between entities—e.g., physical proximity between entities—is monitored, the techniques described herein may be applied in other systems that alternatively or additionally monitor when virtual interactions between entities have occurred in order to determine when two entities have been in virtual contact with one another. While monitoring virtual contact between entities may not have all of the same applications as discussed elsewhere herein regarding monitoring social distancing for the purposes of quantifying disease outbreak risk, monitoring virtual interactions amongst groups and quantifying the distancing and/or connectedness of a virtual contact network for a group may have applications in monitoring the spread of information or ideas amongst persons and/or in monitoring the spread of malware throughout interconnected computer systems. Below, FIG. 7 shows an example of one such system.

Figure 7:
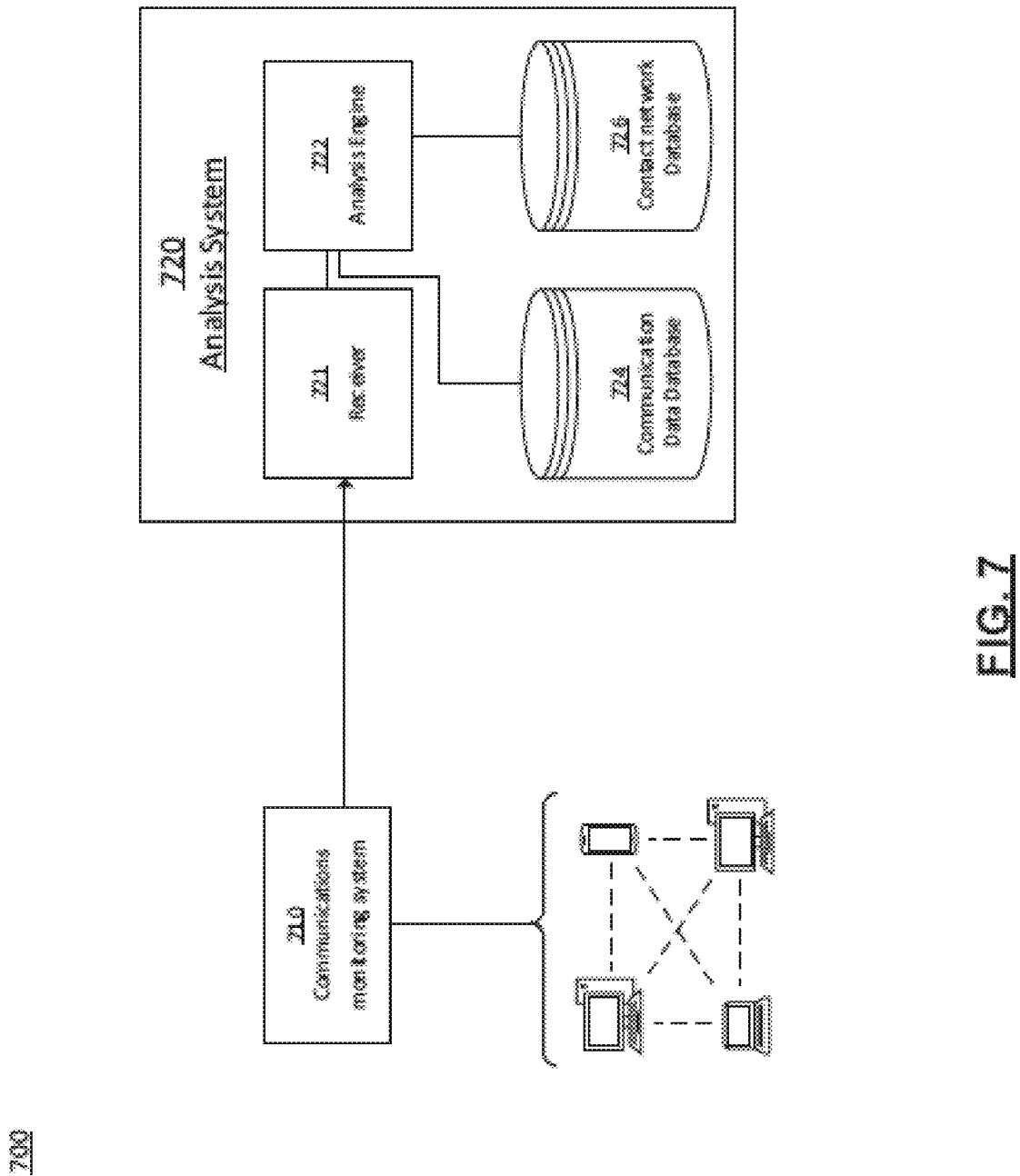
FIG. 7 shows a schematic representation of a system for monitoring and quantifying virtual interactions amongst devices in a computer network, in accordance with some embodiments.

FIG. 7 shows a schematic representation of a system 700 for monitoring and quantifying virtual interactions amongst devices in a computer network, in accordance with some embodiments. System 700 may share any one or more characteristics in common with system 100 described above with respect to FIG. 1. System 700 comprises analysis system 720 which includes receiver 721, analysis engine 722, and contact network database 726. Analysis system 720 and its components 721, 722, and 726 may share any one or more characteristics in common with analysis system 120 and its components 121, 122, and 126 described above with respect to system 100 in FIG. 1.

System 700 may differ from system 100 in that, rather than (or in addition to) being configured to collect signal data from a fleet of mobile electronic devices 110 and to store said data in signal data database 124 and to use said signal data to make determinations regarding contact amongst entities based on physical proximity of entities to one another, system 700 may be configured to collect data regarding electronic communications amongst persons and/or entities and to store said communications data in location communication data database 724 and to use said communications data to make determinations regarding contact amongst entities based on virtual interactions with one another.

For example, communications monitoring system 710 may monitor electronic communications made amongst a group of persons and/or devices and may transmit data regarding said communications to receiver 721 for storage in communication data database 724. Analysis engine 722 may then use the stored communications data to determine which entities have had virtual interactions with one another (e.g., engaged in electronic communication, etc.), and to determine which entities have been "in contact" with one another on that basis. This determination may be used to generate data structures representing contact networks as described elsewhere herein, which may be analyzed as described elsewhere herein.

Figure 8:
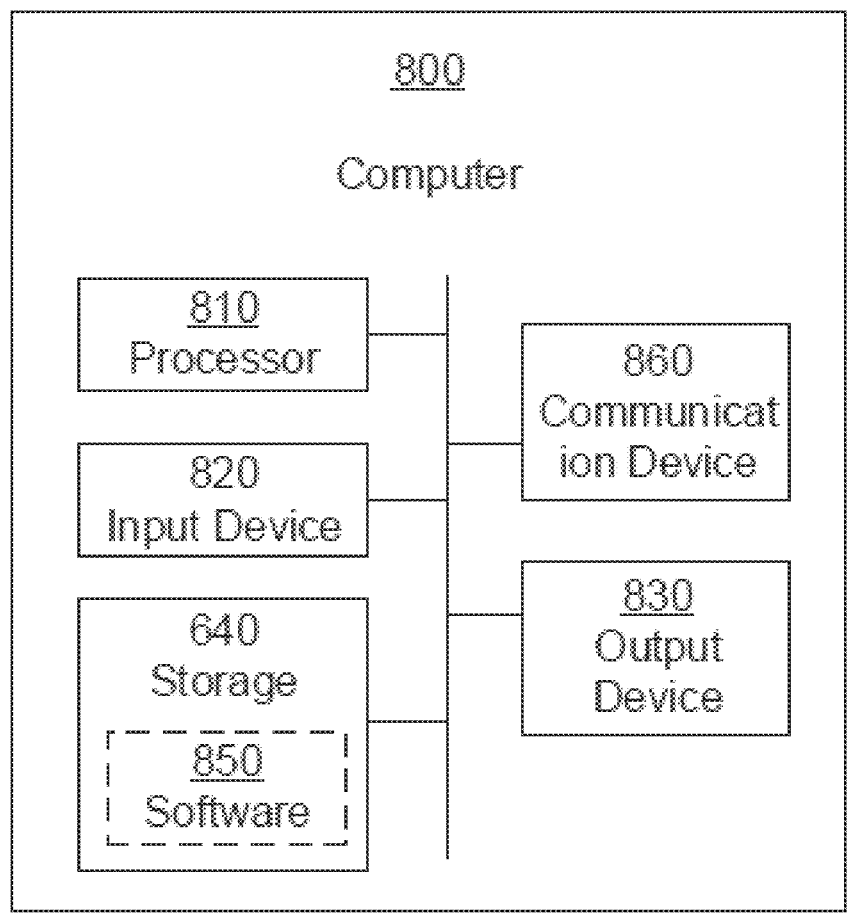
FIG. 8 shows a computer, in accordance with some embodiments.

FIG. 8 shows a computer 800, in accordance with some embodiments. Computer 800 can be a component of an automatic contract tracing system according to the systems and methods described above, such as system 100 of FIG. 1. In some embodiments, computer 800 may execute a method for performing monitoring and quantifying social distancing.

Computer 800 can be a host computer connected to a network. Computer 800 can be a client computer or a server. As shown in FIG. 8, computer 800 can be any suitable type of microprocessor-based device, such as a personal computer, workstation, server, or handheld computing device, such as a phone or tablet. The computer can include, for example, one or more of processor 810, input device 820, output device 830, storage 840, and communication device 860. Input device 820 and output device 830 can correspond to those described above and can either be connectable or integrated with the computer.

Input device 820 can be any suitable device that provides input, such as a touch screen or monitor, keyboard, mouse, or voice-recognition device. Output device 830 can be any suitable device that provides an output, such as a touch screen, monitor, printer, disk drive, or speaker.

Storage 840 can be any suitable device that provides storage, such as an electrical, magnetic, or optical memory, including a random access memory (RAM), cache, hard drive, CD-ROM drive, tape drive, or removable storage disk. Communication device 860 can include any suitable device capable of transmitting and receiving signals over a network, such as a network interface chip or card. The components of the computer can be connected in any suitable manner, such as via a physical bus or wirelessly. Storage 840 can be a non-transitory computer-readable storage medium comprising one or more programs, which, when executed by one or more processors, such as processor 810, cause the one or more processors to execute methods described herein.

Software 850, which can be stored in storage 840 and executed by processor 810, can include, for example, the programming that embodies the functionality of the present disclosure (e.g., as embodied in the systems, computers, servers, and/or devices as described above). In some embodiments, software 850 can include a combination of servers such as application servers and database servers.

Software 850 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 840, that can contain or store programming for use by or in connection with an instruction execution system, apparatus, or device.

Software 850 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include but is not limited to, an electronic, magnetic, optical, electromagnetic, or infrared wired or wireless propagation medium.

Computer 800 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 800 can implement any operating system suitable for operating on the network. Software 850 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

Any of the systems, methods, techniques, and/or features disclosed herein may be combined, in whole or in part, with any other systems, methods, techniques, and/or features disclosed herein.

The invention claimed is:

1. A system for determining a parameter for assessing social distancing between persons in a group, the system comprising:
   a plurality of mobile electronic devices, each of the plurality of mobile electronic devices configured to detect signal data indicating when it is proximate to another one of the plurality of mobile electronic devices, wherein each of the plurality of mobile electronic devices is associated with a location of a respective person in the group;
   a receiver configured to receive, from each of the plurality of mobile electronic devices, detected signal data;
   a storage system configured to store a data structure representing a contact network, generated based on the received detected signal data, representing which pairs of the plurality of mobile electronic devices have been proximate to one another; and
   one or more processors configured to:
      generate, based on the contact network, a first metric representing a predicted number of entities in the contact network with which an entity in the contact network will have interactions in a predetermined amount of time;
      generate, based on the contact network, a second metric comprising a quantification of network exposure risk based on a size of a component of the contact network and an overall network size of the contact network; and
      determine, based on the first metric and the second metric, the parameter for assessing social distancing between persons in the group.

2. The system of claim 1, wherein generating the data structure representing the contact network comprises:
   generating a plurality of nodes, wherein each node of the plurality of nodes represents a respective one of the mobile electronic devices; and
   generating a plurality of edges linking respective pairs of nodes, wherein each edge of the plurality of edges is generated based on the signal data indicating that the respective mobile electronic devices represented by the respective pair of nodes were proximate to one another.

3. The system of claim 2, wherein the one or more processors are configured to generate an edge for a respective pair of nodes in accordance with determining that one or more proximity criteria are satisfied by signal data corresponding to the respective mobile electronic devices represented by the respective pair of nodes.

4. The system of claim 1, wherein the one or more processors are configured to generate the data structure representing the contact network based on the received detected signal data, wherein generating the data structure representing the contact network comprises:
   determining whether the received detected signal data satisfies one or more predefined inclusion criteria for inclusion in the contact network; and
   in accordance with determining that the received detected signal data satisfies the one or more predefined criteria for inclusion in the contact network, generating the data structure representing the contact network based on the received detected signal data.

5. The system of claim 4, wherein the one or more predefined inclusion criteria include a criteria that geolocation data associated with the detected signal data indicates that the signal data was detected within a predefined geographic location.

6. The system of claim 1, wherein determining the parameter for assessing social distancing comprises calculating a distance of a two-dimensional point from an origin, wherein the two-dimensional point is defined by a first coordinate based on the first metric and a second coordinate based on the second metric.

7. The system of claim 6, wherein the first coordinate comprises a minimum of the first metric and a predefined maximum value.

8. The system of claim 1, wherein generating the first metric comprises computing a mean degree of the contact network.

9. The system of claim 1, wherein generating the second metric comprises computing a quotient comprising the size of the component of the contact network divided by the overall network size of the contact network.

10. The system of claim 1, wherein the component of the contact network is a largest connected subgraph of the contact network.

11. The system of claim 1, wherein the component of the contact network is a largest subgraph of the contact network component for which all nodes in the subgraph are connected by less than or equal to a predetermined maximum number of degrees.

12. The system of claim 1, wherein the one or more processors are configured to generate and output an alert in accordance with determining that the parameter for assessing social distancing falls below a predetermined threshold level.

13. The system of claim 1, wherein the one or more processors are configured to generate and cause display of a visualization of the parameter for assessing social distancing between persons in the group.

14. A non-transitory computer-readable storage medium storing instructions for determining a parameter for assessing social distancing between persons in a group, wherein the instructions are configured to be executed by a system comprising:
a plurality of mobile electronic devices, each of the plurality of mobile electronic devices configured to detect signal data indicating when it is proximate to another one of the plurality of mobile electronic devices, wherein each of the plurality of mobile electronic devices is associated with a location of a respective person in the group;
a receiver configured to receive, from each of the plurality of mobile electronic devices, detected signal data;
a storage system configured to store a data structure representing a contact network, generated based on the received detected signal data, representing which pairs of the plurality of mobile electronic devices have been proximate to one another; and
one or more processors, wherein the instructions are configured such that, when executed by the one or more processors, they cause the one or more processors to:
generate, based on the contact network, a first metric representing a predicted number of entities in the contact network with which an entity in the contact network will have interactions in a predetermined amount of time;
generate, based on the contact network, a second metric comprising a quantification of network exposure risk based on a size of a component of the contact network and an overall network size of the contact network; and
determine, based on the first metric and the second metric, the parameter for assessing social distancing between persons in the group.

15. A method for determining a parameter for assessing social distancing between persons in a group, the method configured to be executed by a system comprising:
a plurality of mobile electronic devices, each of the plurality of mobile electronic devices configured to detect signal data indicating when it is proximate to another one of the plurality of mobile electronic devices, wherein each of the plurality of mobile electronic devices is associated with a location of a respective person in the group;
a receiver configured to receive, from each of the plurality of mobile electronic devices, detected signal data;
a storage system configured to store a data structure representing a contact network, generated based on the received detected signal data, representing which pairs of the plurality of mobile electronic devices have been proximate to one another; and
one or more processors,
wherein the method comprises:
generating, based on the contact network, a first metric representing a predicted number of entities in the contact network with which an entity in the contact network will have interactions in a predetermined amount of time;
generating, based on the contact network, a second metric comprising a quantification of network exposure risk based on a size of a component of the contact network and an overall network size of the contact network; and
determining, based on the first metric and the second metric, the parameter for assessing social distancing between persons in the group.

16. A system for determining a parameter for assessing distancing between a plurality of entities in a group, the system comprising:
one or more sensors, each of the one or more sensors configured to monitor a location of the plurality of entities;
a receiver configured to receive, from each of the one or more sensors, location data indicating locations over time for each of the plurality of entities;
a storage system configured to store a data structure representing a contact network, generated based on the received location data, representing which pairs of the plurality of entities have been proximate to one another; and
one or more processors configured to:
generate, based on the contact network, a first metric representing a predicted number of entities in the contact network with which an entity in the contact network will have interactions in a predetermined amount of time;
generate, based on the contact network, a second metric comprising a quantification of network exposure risk based on a size of a component of the contact network and an overall network size of the contact network; and
determine, based on the first metric and the second metric, the parameter for assessing distancing between the plurality of entities.

17. The system of claim 16, wherein the one or more sensors comprise one or more geolocation sensors configured to monitor a geographic location of a respective entity of the plurality of entities.

18. The system of claim 16, wherein the one or more sensors comprise one or more optical sensors configured to monitor a location of a respective entity of the plurality of entities.

19. The system of claim 16, wherein the one or more sensors comprise one or more antennas configured to detect a signal indicating that the antenna is located within a predefined distance of a transmitter.

20. The system of claim 19, wherein one more of the antennas are carried by one of the entities.

21. The system of claim 19, wherein one or more of the transmitters are carried by one of the entities.

22. The system of claim 16, wherein the one or more processors are configured to generate the data structure representing the contact network based on the received location data, wherein generating the data structure representing the contact network comprises:
 generating a plurality of nodes, wherein each node of the plurality of nodes represents a respective one of the entities; and
 generating a plurality of edges linking respective pairs of nodes, wherein each edge of the plurality of edges is generated based on the location data indicating that the respective entities represented by the respective pair of nodes were proximate to one another.

23. The system of claim 22, wherein the one or more processors are configured to generate an edge for a respective pair of nodes in accordance with determining that one or more proximity criteria are satisfied by location data corresponding to the respective entities represented by the respective pair of nodes.

24. The system of claim 16, wherein the one or more processors are configured to generate the data structure representing the contact network based on the received location data, wherein generating the data structure representing the contact network comprises:
 determining whether the received location data satisfies one or more predefined inclusion criteria for inclusion in the contact network; and
 in accordance with determining that the received location data satisfies the one or more predefined inclusion criteria for inclusion in the contact network, generating the data structure representing the contact network based on the received detected signal data.

25. The system of claim 24, wherein the one or more predefined inclusion criteria include a criteria that the location data indicates that a location within a predefined geographic location.

26. The system of claim 16, wherein determining the parameter for assessing distancing comprises calculating a distance of a two-dimensional point from an origin, wherein the two-dimensional point is defined by a first coordinate based on the first metric and a second coordinate based on the second metric.

27. The system of claim 26, wherein the first coordinate comprises a minimum of the first metric and a predefined maximum value.

28. The system of claim 16, wherein generating the first metric comprises computing a mean degree of the contact network.

29. The system of claim 16, wherein generating the second metric comprises computing a quotient comprising the size of the component of the contact network divided by the overall network size of the contact network.

30. The system of claim 16, wherein the component of the contact network is a largest connected subgraph of the contact network.

31. The system of claim 16, wherein the component of the contact network is a largest subgraph of the contact network component for which all nodes in the subgraph are connected by less than or equal to a predetermined maximum number of degrees.

32. The system of claim 16, wherein the one or more processors are configured to generate and output an alert in accordance with determining that the parameter for assessing distancing falls below a predetermined threshold level.

33. The system of claim 16, wherein the one or more processors are configured to generate and cause display of a visualization of the parameter for assessing distancing between entities in the group.

34. A non-transitory computer-readable storage medium storing instructions for determining a parameter for assessing distancing between entities in a group, wherein the instructions are configured to be executed by a system comprising:
 one or more sensors, each of the one or more sensors configured to monitor a location of a plurality of entities;
 a receiver configured to receive, from each of the one or more sensors, location data indicating locations over time for each of the plurality of entities;
 a storage system configured to store a data structure representing a contact network, generated based on the received location data, representing which pairs of the plurality of entities have been proximate to one another; and
 one or more processors, wherein the instructions are configured such that, when executed by the one or more processors, they cause the one or more processors to:
  generate, based on the contact network, a first metric representing a predicted number of entities in the contact network with which an entity in the contact network will have interactions in a predetermined amount of time;
  generate, based on the contact network, a second metric comprising a quantification of network exposure risk based on a size of a component of the contact network and an overall network size of the contact network; and
  determine, based on the first metric and the second metric, the parameter for assessing distancing between the plurality of entities.

35. A method for determining a parameter for assessing distancing between entities in a group, the method configured to be executed by a system comprising:
 one or more sensors, each of the one or more sensors configured to monitor a location of a plurality of entities;
 a receiver configured to receive, from each of the one or more sensors, location data indicating locations over time for each of the plurality of entities;
 a storage system configured to store a data structure representing a contact network, generated based on the received location data, representing which pairs of the plurality of entities have been proximate to one another; and
 one or more processors,
 wherein the method comprises:
  generating, based on the contact network, a first metric representing a predicted number of entities in the contact network with which an entity in the contact network will have interactions in a predetermined amount of time;

generating, based on the contact network, a second metric comprising a quantification of network exposure risk based on a size of a component of the contact network and an overall network size of the contact network; and determining, based on the first metric and the second metric, the parameter for assessing distancing between the plurality of entities.

36. A system for determining a parameter for assessing virtual interaction between entities in a group, the system comprising:
one or more sensors, each of the one or more sensors configured to monitor electronic communications between a plurality of entities;
a receiver configured to receive, from each of the one or more sensors, communications data indicating interactions between one or more pairs amongst the plurality of entities;
a storage system configured to store a data structure representing a contact network, generated based on the received communications data, representing which pairs of the plurality of entities have communicated with one another; and
one or more processors configured to:
generate, based on the contact network, a first metric representing a predicted number of entities in the contact network with which an entity in the contact network will have interactions in a predetermined amount of time;
generate, based on the contact network, a second metric comprising a quantification of network exposure risk based on a size of a component of the contact network and an overall network size of the contact network; and
determine, based on the first metric and the second metric, the parameter for assessing virtual interaction between entities.

37. The system of claim 36, wherein the plurality of entities comprises a plurality of electronic devices configured to communicate electronically amongst one another.

38. The system of claim 36, wherein the plurality of entities comprises a plurality of persons communicating amongst one another via electronic communication.

39. The system of claim 36, wherein the one or more processors are configured to generate the data structure representing the contact network based on the received communications data, wherein generating the data structure representing the contact network comprises:
generating a plurality of nodes, wherein each node of the plurality of nodes represents a respective one of the entities; and
generating a plurality of edges linking respective pairs of nodes, wherein each edge of the plurality of edges is generated based on the communications data indicating that the respective entities represented by the respective pair of nodes communicated with one another.

40. The system of claim 39, wherein the one or more processors are configured to generate an edge for a respective pair of nodes in accordance with determining that one or more communications criteria are satisfied by communications data corresponding to the respective entities represented by the respective pair of nodes.

41. The system of claim 36, wherein the one or more processors are configured to generate the data structure representing the contact network based on the received communications data, wherein generating the data structure representing the contact network comprises:

determining whether the received communications data satisfies one or more predefined inclusion criteria for inclusion in the contact network; and
in accordance with determining that the received communications data satisfies the one or more predefined criteria for inclusion in the contact network, generating the data structure representing the contact network based on the received communications data.

42. The system of claim 36, wherein determining the parameter for assessing virtual interaction comprises calculating a distance of a two-dimensional point from an origin, wherein the two-dimensional point is defined by a first coordinate based on the first metric and a second coordinate based on the second metric.

43. The system of claim 42, wherein the first ter-m coordinate comprises a minimum of the first metric and a predefined maximum value.

44. The system of claim 36, wherein generating the first metric comprises computing a mean degree of the contact network.

45. The system of claim 36, wherein generating the second metric comprises computing a quotient comprising the size of the component of the contact network divided by the overall network size of the contact network.

46. The system of claim 36, wherein the component of the contact network is a largest connected subgraph of the contact network.

47. The system of claim 36, wherein the component of the contact network is a largest subgraph of the contact network component for which all nodes in the subgraph are connected by less than or equal to a predetermined maximum number of degrees.

48. The system of claim 36, wherein the one or more processors are configured to generate and output an alert in accordance with determining that the parameter for assessing virtual interaction falls below a predetermined threshold level.

49. The system of claim 36, wherein the one or more processors are configured to generate and cause display of a visualization of the parameter for assessing virtual interaction between entities in the group.

50. A non-transitory computer-readable storage medium storing instructions for determining a parameter for assessing virtual interaction between entities in a group, wherein the instructions are configured to be executed by a system comprising:
one or more sensors, each of the one or more sensors configured to monitor electronic communications between a plurality of entities;
a receiver configured to receive, from each of the one or more sensors, communications data indicating interactions between one or more pairs amongst the plurality of entities;
a storage system configured to store a data structure representing a contact network, generated based on the received communications data, representing which pairs of the plurality of entities have communicated with one another; and
one or more processors, wherein the instructions are configured such that, when executed by the one or more processors, they cause the one or more processors to:
generate, based on the contact network, a first metric representing a predicted number of entities in the contact network with which an entity in the contact network will have interactions in a predetermined amount of time;

generate, based on the contact network, a second metric comprising a quantification of network exposure risk based on a size of a component of the contact network and an overall network size of the contact network; and determine, based on the first metric and the second metric, the parameter for assessing virtual interaction between entities.

51. A method for determining a parameter for assessing virtual interaction between entities in a group, wherein the method is configured to be executed by a system comprising:

one or more sensors, each of the one or more sensors configured to monitor electronic communications between a plurality of entities;

a receiver configured to receive, from each of the one or more sensors, communications data indicating interactions between one or more pairs amongst the plurality of entities;

a storage system configured to store a data structure representing a contact network, generated based on the received communications data, representing which pairs of the plurality of entities have communicated with one another; and one or more processors, wherein the method comprises:

generating, based on the contact network, a first metric representing a predicted number of entities in the contact network with which an entity in the contact network will have interactions in a predetermined amount of time;

generating, based on the contact network, a second metric comprising a quantification of network exposure risk based on a size of a component of the contact network and an overall network size of the contact network; and determining, based on the first metric and the second metric, the parameter for assessing virtual interaction between entities.

* * * * *